(12) United States Patent  (10) Patent No.: US 7,705,888 B2
Kitawaki  (45) Date of Patent: Apr. 27, 2010

(54) SYSTEM FOR CHANGING SETUP OF FIRST DEVICE THAT EXECUTES PREDETERMINED FUNCTION BY SECOND DEVICE AND THESE DEVICES

(75) Inventor: Haruyuki Kitawaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 11/219,839

(22) Filed: Sep. 7, 2005

(65) Prior Publication Data

US 2006/0007319 A1  Jan. 12, 2006

Related U.S. Application Data

(62) Division of application No. 09/977,319, filed on Oct. 16, 2001, now Pat. No. 6,980,234.

(30) Foreign Application Priority Data

Oct. 19, 2000  (JP) .............................. 2000-319887
Oct. 20, 2000  (JP) .............................. 2000-321677

(51) Int. Cl.
*H04N 5/232* (2006.01)
*H04N 5/225* (2006.01)
(52) U.S. Cl. .............................. 348/211.99; 348/207.1; 348/207.11; 348/211.2; 348/211.3; 348/211.6
(58) Field of Classification Search .............. 348/207.1, 348/207.11, 211.99, 211.1, 211.2, 211.3, 348/211.4, 211.5, 211.6, 552, 143, 231.99, 348/333.03; 382/236
See application file for complete search history.

(56) References Cited

U.S. PATENT DOCUMENTS

| | | | |
|---|---|---|---|
| 5,606,365 A * | 2/1997 | Maurinus et al. | 348/222.1 |
| 5,999,213 A * | 12/1999 | Tsushima et al. | 348/180 |
| 6,006,039 A * | 12/1999 | Steinberg et al. | 396/57 |
| 6,288,800 B1 | 9/2001 | Izumi | 358/468 |
| 6,433,818 B1 * | 8/2002 | Steinberg et al. | 348/161 |
| 6,628,325 B1 * | 9/2003 | Steinberg et al. | 348/211.1 |
| 6,707,947 B1 * | 3/2004 | Shinohara et al. | 382/236 |
| 6,750,902 B1 * | 6/2004 | Steinberg et al. | 348/211.3 |
| 7,117,396 B2 * | 10/2006 | Komarla et al. | 714/45 |
| 2001/0045983 A1 * | 11/2001 | Okazaki et al. | 348/211 |
| 2002/0101514 A1 * | 8/2002 | Watanabe | 348/211 |
| 2005/0075964 A1 * | 4/2005 | Quinn et al. | 705/37 |

FOREIGN PATENT DOCUMENTS

| | | |
|---|---|---|
| JP | 05-083350 | 4/1993 |
| JP | 08-237635 | 9/1996 |
| JP | 09-325827 | 12/1997 |
| JP | 11-215412 | 8/1999 |
| JP | 2000-115624 | 4/2000 |

\* cited by examiner

*Primary Examiner*—Sinh Tran
*Assistant Examiner*—Christopher K Peterson
(74) *Attorney, Agent, or Firm*—Fitzpatrick, Cella, Harper & Scinto

(57) ABSTRACT

The user of an objective device registers a favorite setup of the objective device in a user setup data recording device in correspondence with user information based on a physical feature. Upon detecting the physical feature of the user, the objective device sends its device ID to the user setup data recording device together with the user information based on the physical feature. The user setup data recording device sends setup data of the objective device, which is set in advance by the user, to the objective device on the basis of the received user information and device ID. The objective device changes its setup on the basis of the received setup data.

8 Claims, 38 Drawing Sheets

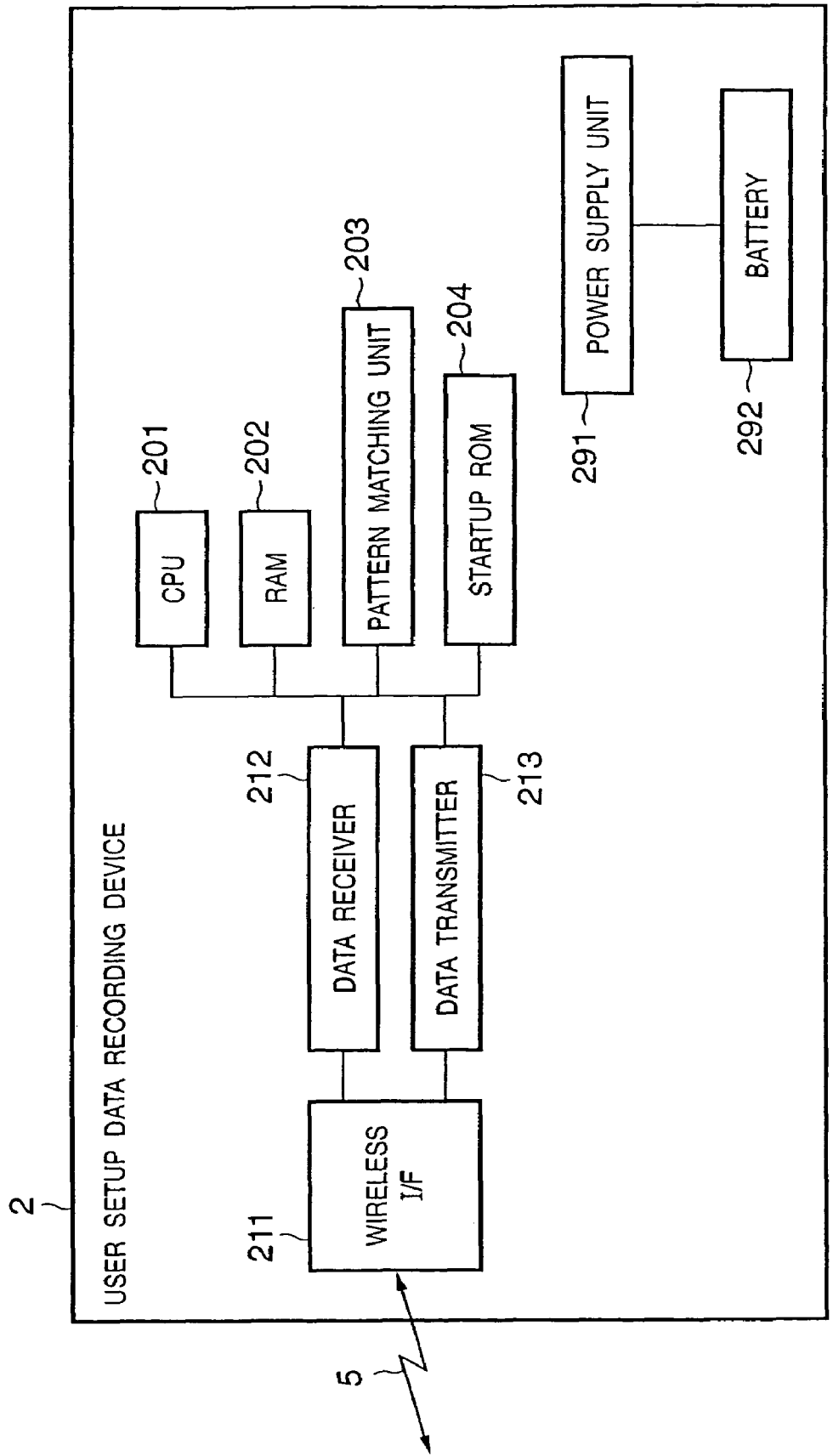

FIG. 7

| AUTHENTICATION DATA | Hgoj&nf39···· | } AUTHENTICATION DATA |
| --- | --- | --- |
| MANUFACTURE NAME | ○○○○ | |
| PRODUCT CATEGORY | Digital Camera | } DEVICE ID DATA |
| PRODUCT NAME | Auto Set | |
| SERIAL NUMBER | ASC - 0000001 | |
| SHUTTER SPEED | 1/6 SEC | |
| AF ON/OFF | ON | |
| ISO 100/400 | 100 | } DEVICE SETUP DATA |
| ⋮ | ⋮ | |

FIG. 10

| AUTHENTICATION DATA | Hgoj&nf39···· | } AUTHENTICATION DATA |
| --- | --- | --- |
| MANUFACTURE NAME | ○○○○ | |
| PRODUCT CATEGORY | Digital Camera | } DEVICE ID DATA |
| PRODUCT NAME | Auto Set | |
| SERIAL NUMBER | ASC - 0000001 | |

FIG. 11

| MANUFACTURE NAME | ○○○○ |
|---|---|
| PRODUCT CATEGORY | Digital Camera |
| PRODUCT NAME | Auto Set |
| SERIAL NUMBER | ASC - 0000001 |
| SHUTTER SPEED | 1/300 SEC |
| AF ON/OFF | OFF |
| ISO 100/400 | 400 |
| ⋮ | ⋮ |

DEVICE ID DATA (MANUFACTURE NAME, PRODUCT CATEGORY, PRODUCT NAME, SERIAL NUMBER)

DEVICE SETUP DATA (SHUTTER SPEED, AF ON/OFF, ISO 100/400, ...)

FIG. 21

| USER NAME | TARO YAMADA | HANAKO SUZUKI |
|---|---|---|
| USER ID | 12345 | 12346 |
| GENDER | MALE | FEMALE |
| REGISTERED AUTHENTICATION DATA | Hgoj&nf39.......... | 8HkgoHkj.......... |
| CHARGE DATA | 2000 YEN | 1000 YEN |

FIG. 23

| AUTHENTICATION DATA | Hgoj&nf39.......... |
|---|---|
| MANUFACTURER NAME | ○○○○○ |
| USE HISTORY | 15 |
| PRODUCT CATEGORY | Digital Camera |
| USE HISTORY | 20 |
| PRODUCT NAME | Auto Set |
| USE HISTORY | 43 |
| SERIAL NUMBER | ASC - 0000001 |
| USE HISTORY | 55 |
| MANUFACTURER NAME | ○○○○○ system |
| USE HISTORY | 111 |

FIG. 25

| USE ID | 12345 |
|---|---|
| USE PERMISSION DEVICE ID DATA | ASC - 0000001 |
| SERVICE LEVEL | S |
| USE HISTORY | 15 |
| USE PERMISSION DEVICE ID DATA | Auto Set |
| SERVICE LEVEL | A |
| USE HISTORY | 20 |
| USE PERMISSION DEVICE ID DATA | Digital Camera |
| SERVICE LEVEL | B |
| USE HISTORY | 43 |
| USE PERMISSION DEVICE ID DATA | ○○○○○ |
| SERVICE LEVEL | C |
| USE HISTORY | 55 |

FIG. 29A

| AUTHENTICATION DATA | OjidiOl |
|---|---|
| MANUFACTURER NAME | ○○○○○ |
| USE HISTORY | 145 |
| PRODUCT CATEGORY | AIR CONDITIONER |
| USE HISTORY | 54 |
| PRODUCT NAME | AUTOMATIC AIR CONDITIONER |
| USE HISTORY | 23 |
| SERIAL NUMBER | CAA - 1111111 |
| USE HISTORY | 12 |
| TEMPERATURE | 26 |
| HUMIDITY | 30 |

FIG. 29B

| AUTHENTICATION DATA | Aoi jO J |
|---|---|
| MANUFACTURER NAME | ○○○○○ |
| USE HISTORY | 23 |
| PRODUCT CATEGORY | AIR CONDITIONER |
| USE HISTORY | 15 |
| PRODUCT NAME | AUTOMATIC AIR CONDITIONER |
| USE HISTORY | 13 |
| SERIAL NUMBER | CAA - 1111111 |
| USE HISTORY | 2 |
| TEMPERATURE | 22 |
| HUMIDITY | 10 |

F I G. 30
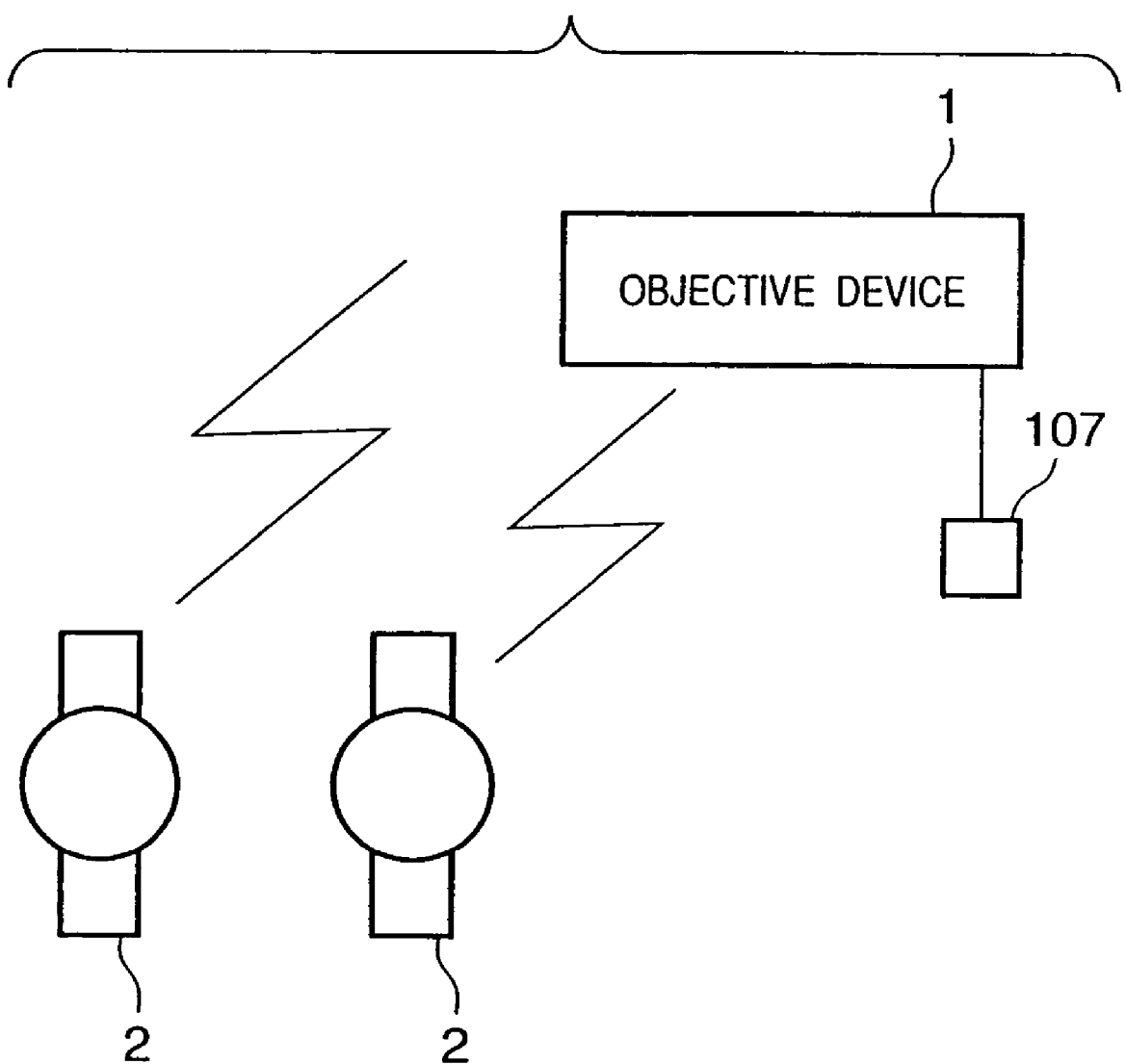

FIG. 32

| AUTHENTICATION DATA | OljdiOl.......... |
|---|---|
| MANUFACTURE NAME | ○○○○○ |
| PRODUCT CATEGORY | AIR CONDITIONER |
| PRODUCT NAME | AUTOMATIC AIR CONDITIONER |
| SERIAL NUMBER | CAA - 1111111 |
| TEMPERATURE | |

FIG. 33

| AUTHENTICATION DATA | Aoi:jO:J.......... | } AUTHENTICATION DATA |
| --- | --- | --- |
| MANUFACTURE NAME | ○○○○○ | |
| PRODUCT CATEGORY | AIR CONDITIONER | } DEVICE ID DATA |
| PRODUCT NAME | AUTOMATIC AIR CONDITIONER | |
| SERIAL NUMBER | CAA - 1111111 | |
| TEMPERATURE | | } DEVICE SETUP DATA |
| HUMIDITY | | |

F I G. 34

| AUTHENTICATION DATA | Hgoj&nf39.......... | AUTHENTICATION DATA |
| --- | --- | --- |
| MANUFACTURE NAME | ○○○○○ | DEVICE ID DATA |
| PRODUCT CATEGORY | Digital Camera | |
| PRODUCT NAME | Auto Image Captor | |
| SERIAL NUMBER | AIC - 0000123 | |
| IMAGE SAVING DESTINATION URL | http://www.canon.co.jp/hozon | DEVICE SETUP DATA |

FIG. 35

| AUTHENTICATION DATA | Hgoj&nf39.......... | } AUTHENTICATION DATA |
|---|---|---|
| MANUFACTURE NAME | ○○○○○ | |
| PRODUCT CATEGORY | conveni printer | |
| PRODUCT NAME | Auto Printer | } DEVICE ID DATA |
| SERIAL NUMBER | AP - 0000123 | |
| USER DATA ADDRESS | http://www.user.com/user1 | } DEVICE SETUP DATA |
| NEWSPAPER ADDRESS | http://www.news.com/daily | |

FIG. 36

| AUTHENTICATION DATA | Hgoj&nf39.......... | } AUTHENTICATION DATA |
| --- | --- | --- |
| MANUFACTURE NAME | ○○○○○ | } DEVICE ID DATA |
| PRODUCT CATEGORY | note pc | |
| PRODUCT NAME | Auto Note | |
| SERIAL NUMBER | AP - 0000123 | |
| ADDRESS 1 | Canonet-Tokyo : 1234-5678 | } DEVICE SETUP DATA |
| ADDRESS 2 | Canonet-Osaka : 9876-5432 | |

FIG. 37

| | | |
|---|---|---|
| AUTHENTICATION DATA | Hgoj&nf39.......... | AUTHENTICATION DATA |
| MANUFACTURE NAME | ○○○○○ | DEVICE ID DATA |
| PRODUCT CATEGORY | Car Seat | |
| PRODUCT NAME | Auto Car Seat Set | |
| SERIAL NUMBER | ACSS-0000123 | |
| SEATBACK ANGLE | $-10°$ | DEVICE SETUP DATA |
| SEAT HEIGHT | +10cm | |
| SEAT BACK-AND-FORTH POSITION | $-5$cm | |
| HEADREST ANGLE | $+5°$ | |

F I G. 38

| AUTHENTICATION DATA | Hgoj&nf39.......... | } AUTHENTICATION DATA |
|---|---|---|
| MANUFACTURE NAME | ○○○○○ | |
| PRODUCT CATEGORY | Massage Chair | |
| PRODUCT NAME | Auto Massage Chair | } DEVICE ID DATA |
| SERIAL NUMBER | AMC - 0000123 | |
| SEATBACK ANGLE | −10° | |
| FOOTREST ANGLE | +10cm | |
| FOOT VIBRATION STRENGTH | LEVEL 3 | |
| OPERATION TIME | 15 MIN | } DEVICE SETUP DATA |
| MASSAGE TYPE | MASSAGE MAIN | |
| MASSAGE STRENGTH | LEVEL 2 | |
| MASSAGE SCHEDULE | SCHEDULE 4 | |

SYSTEM FOR CHANGING SETUP OF FIRST DEVICE THAT EXECUTES PREDETERMINED FUNCTION BY SECOND DEVICE AND THESE DEVICES

RELATED APPLICATION

This application is a divisional of application Ser. No. 09/977,319, filed Oct. 16, 2001, the entire disclosure of which is hereby incorporated by reference.

FIELD OF THE INVENTION

The present invention relates to a system for changing the setups of a first device, which executes a predetermined function, by a second device, and these devices.

BACKGROUND OF THE INVENTION

Conventionally, many devices allow information setups corresponding to user's requests and favor. For example, in a digital camera, many functions such as an aperture, shutter speed, white balance, exposure time, the way flash light is emitted, self-timer time duration, presence/absence of date insertion, and the like can be set in correspondence with user's favor.

Also, a system that can record several patterns of setup data in a device is available. When the user selects one of several patterns of setup data via some user interface, information is set in the device on the basis of the selected setup data.

However, in the prior art, when many users use a single digital camera, and want to set it according to their favors, each user must manually re-input setup data. Furthermore, once a given user sets the digital camera according to his or her favor, if another user sets up the digital camera again, that user must also manually set up the camera again.

That is, currently available devices can be set according to user's favor. However, when another user sets up a given device again, a given user must set up that device again according to his or her favor. Such case frequently occurs when a plurality of users use a common device.

The aforementioned system that can record several patterns of setup data forces the user to select one pattern. Furthermore, since the system can only record several patterns of setup data, it cannot cope with a case wherein many unspecific users want to use that device with optimal setups.

SUMMARY OF THE INVENTION

It is an object of the present invention to allow easy setups of a device.

It is another object of the present invention to obviate the need for user's manual re-setup process every time the user re-uses the device which has been set once.

It is still another object of the present invention to identify a user who operates a device, and execute different processes for respective users.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing the arrangement of a user setup data recording device;

FIG. 7 is a table showing data to be sent from the objective device to the user setup data recording device upon registration;

FIG. 10 is a table showing data to be sent from the objective device to the user setup data recording device when broadcast is not made;

FIG. 11 is a table showing user setup data to be sent from the user setup data recording device to the objective device as a reply upon setting;

FIG. 21 shows the format of a database present in the objective device 1 or an authentication server 3;

FIG. 23 shows the format of a database present in a user setup data recording device 2;

FIG. 25 shows the format of a database present in an authentication server 3 according to the sixth embodiment;

FIGS. 29A and 29B show the format of a database present in a user setup data recording device 2 according to the ninth embodiment;

FIG. 30 shows an image of how processing is executed according to the ninth embodiment;

FIG. 32 shows the format of data to be sent to the user setup data recording device 2 according to the ninth embodiment;

FIG. 33 shows another format of data to be sent to the user setup data recording device 2 according to the ninth embodiment;

FIG. 34 shows an example of data to be sent from the user setup data recording device to the objective device when the objective device is a network connection device;

FIG. 35 shows an example of data to be sent from the user setup data recording device to the objective device when the objective device is a printer;

FIG. 36 shows an example of data to be sent from the user setup data recording device to the objective device when the objective device is a device which is connected to a network via an access point;

FIG. 37 shows an example of data to be sent from the user setup data recording device to the objective device when the objective device is a vehicle seat; and FIG. 38 shows an example of data to be sent from the user setup data recording device to the objective device when the objective device is a massage chair.

DESCRIPTION OF THE PREFERRED EMBODIMENTS

Preferred embodiments of the present invention will be described hereinafter with reference to the accompanying drawings. In this embodiment, a device in which information is to be set is called an "objective device", and a device which saves setup data of various objective devices and sets the data in the objective devices is called a "user setup data recording device".

The user setup data recording device of this embodiment is of wristwatch type, and the user wears it on a wrist. On the other hand, the objective device is a digital camera, which can be adjusted according to setup data by operating motors and the like on the basis of the setup data received from the user setup data recording device. Furthermore, a fingerprint sensor that measures a personal feature is used as a sensor.

First Embodiment

Figure 1:
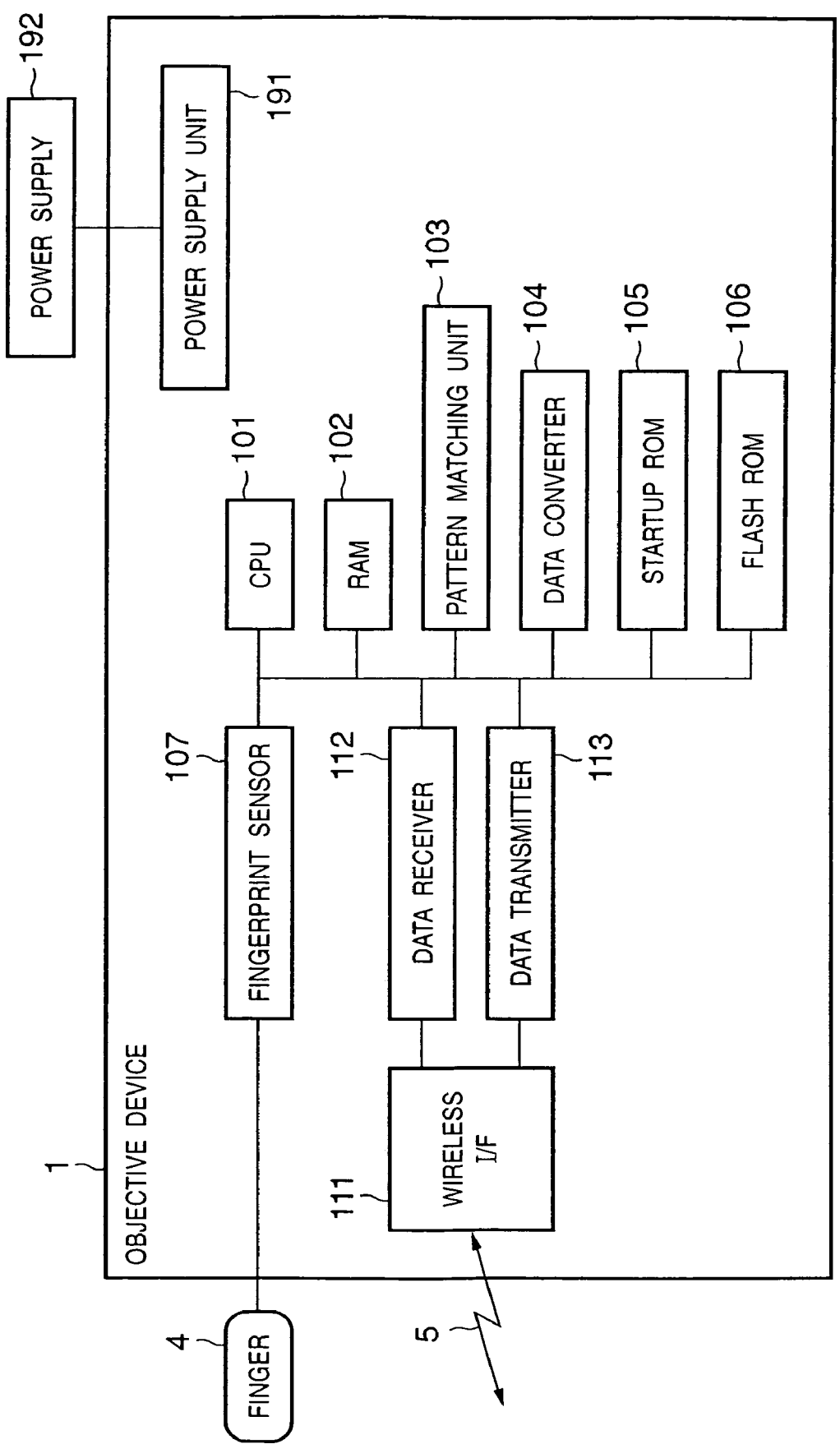
FIG. 1 is a block diagram showing the arrangement of an information setting unit built in a digital camera as an objective device.

FIG. 1 is a block diagram showing the arrangement of an information setting unit built in a digital camera as an objective device. An objective device 1 has an information setting unit in which a CPU 101, ROM 102, pattern matching unit 103, data converter 104, startup ROM 105, flash ROM 106, fingerprint sensor 107, data receiver 112, and data transmitter 113 are connected to a bus. The fingerprint sensor 107 detects a fingerprint when a finger 4 is pressed against it. The data receiver 112 and data transmitter 113 are connected to a wireless interface (I/F) 111, and exchange data with a user setup data recording device 2 via a wireless channel 5. The objective device 1 has a power supply unit 191, which is connected to a power supply 192, and supplies electric power to respective units.

FIG. 2 is a block diagram showing the arrangement of the user setup data recording device. The user setup data recording device 2 has an arrangement in which a CPU 201, RAM 202, flash ROM 203, startup ROM 204, data receiver 212, and data transmitter 213 are connected via a bus. The data receiver 212 and data transmitter 213 are connected to a wireless interface (I/F) 211, and exchange data with the objective device 1 via the wireless channel 5. The user setup data recording device 2 has a power supply unit 291, which is connected to a power supply 292, and supplies electric power to respective units.

Figure 3A:
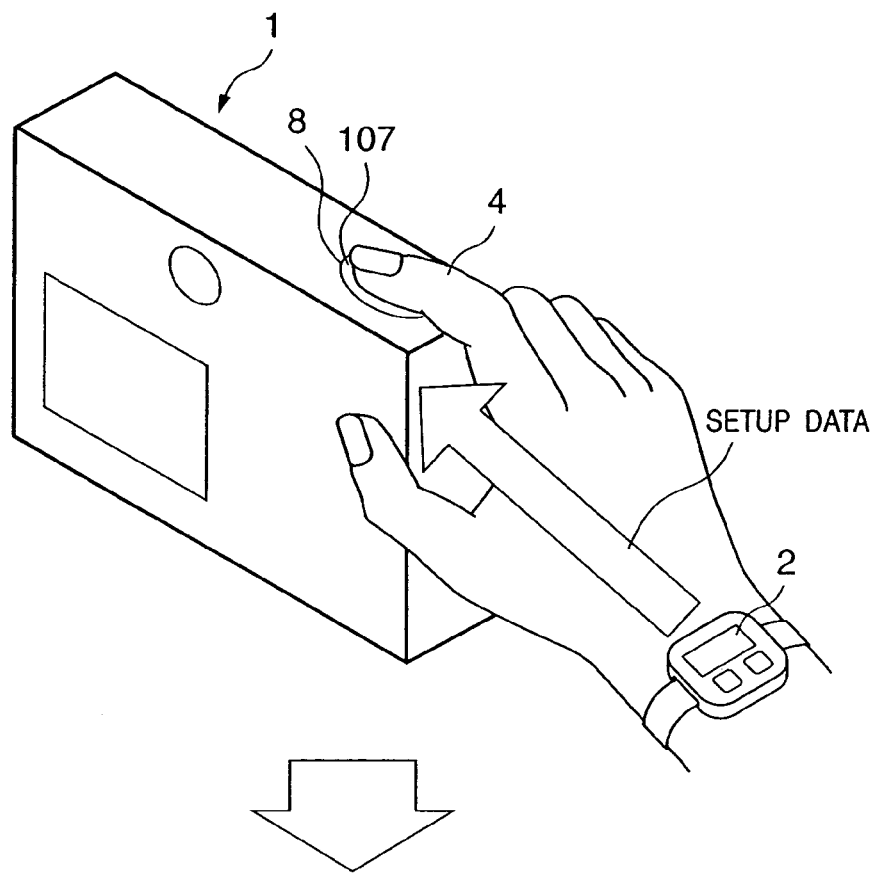
FIGS. 3A and 3B show a state wherein the user sets up various functions of a digital camera.
Figure 3B:
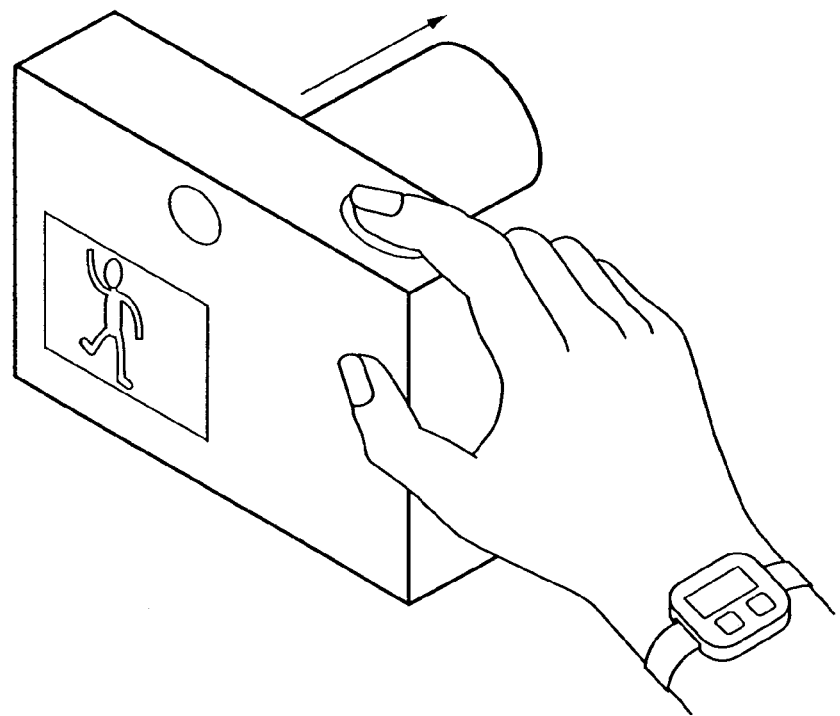

FIGS. 3A and 3B show a state wherein the user sets up various functions of the digital camera. As illustrated in FIG. 3A, when a fingerprint is detected by the fingerprint sensor 107 provided to a shutter button 8 upon pressing the shutter button 8 of the digital camera as the objective device 1, the objective device 1 receives setup data from the user setup data recording device 2. As shown in FIG. 3B, zoom adjustment is done according to the received setup data.

Figure 4:
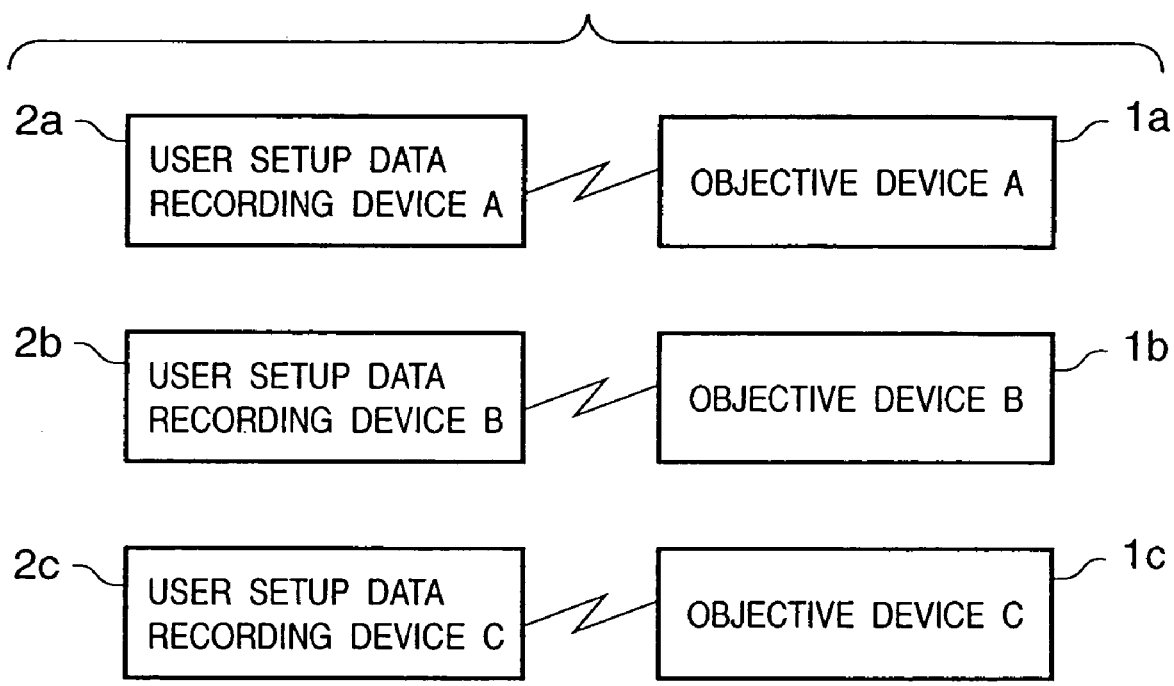
FIG. 4 is a diagram showing setups of functions done between user setup data recording devices and objective devices.

FIG. 4 shows setups of functions done between user setup data recording devices and objective devices. For example, when the user setup data recording device 2 is user setup data recording device A (2a), the objective device 1 becomes objective device A (1a) in which setup data from user setup data recording device A (2a) are registered, by executing the operation shown in FIG. 3A. Likewise, when the user setup data recording device 2 is user setup data recording device B (2b) or C (2c), the objective device 1 becomes objective device B (1b) or C (1c) in which setup data from user setup data recording device B (2b) or C (2c) are registered, by executing the operation shown in FIG. 3A.

[Registration Process]

Figure 5:
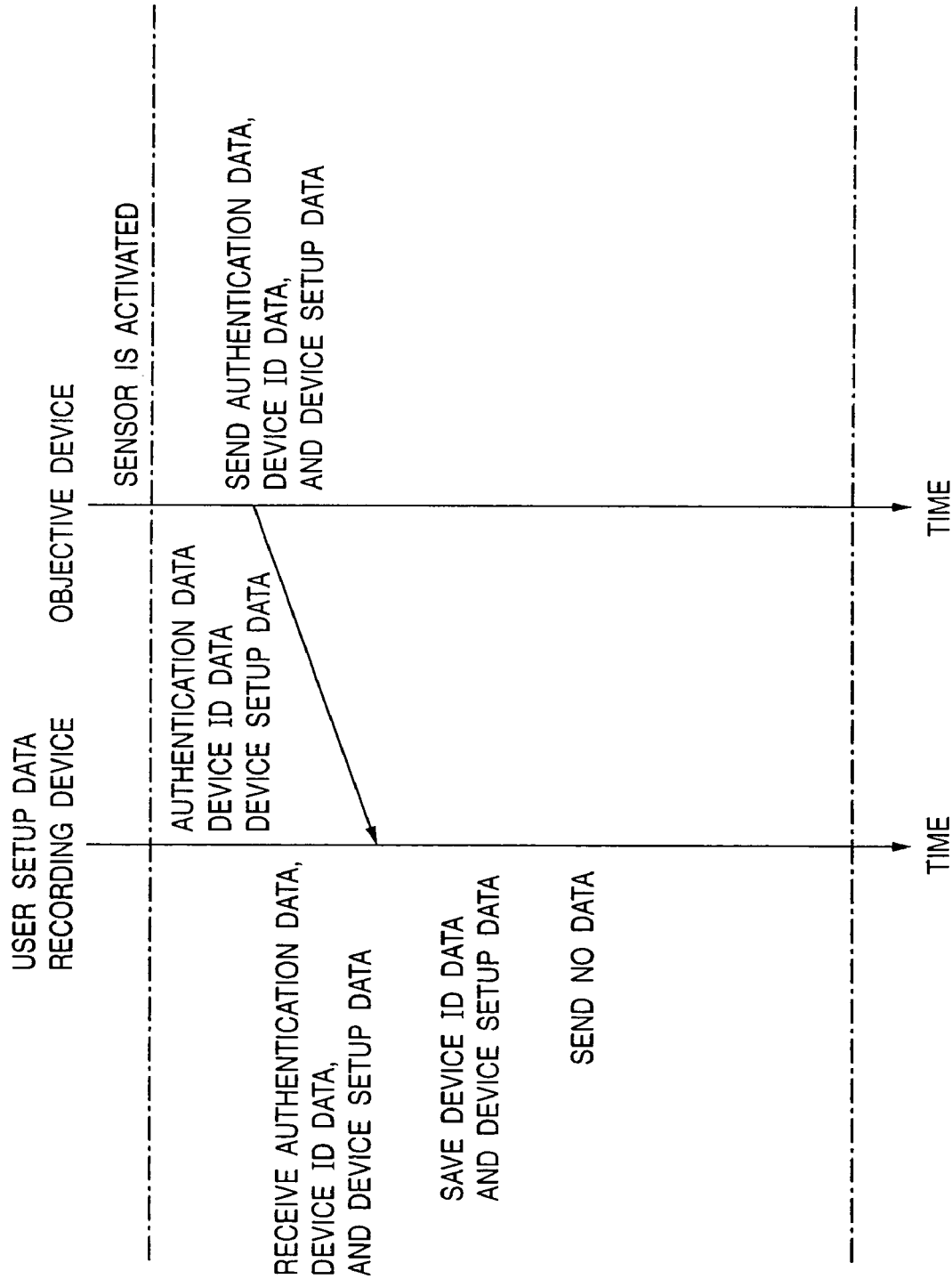
FIG. 5 is a timeline diagram between devices upon registration.

A process for registering data from the objective device 1 in the user setup data recording device 2 will be explained first. FIG. 5 is a timeline diagram between the devices upon registration. The registration sequence includes the following steps A, B, and C.

A. Authentication data is recorded in the user setup data recording device.

The user registers authentication data in the user setup data recording device 2 using a device exclusively used to record authentication data or the objective device 1. That is, a fingerprint of the user is read by the fingerprint sensor as physical information, and the read data is converted into authentication data, which is sent to and recorded in the user setup data recording device 2 via the wireless channel. Note that the read data may be directly used as authentication data.

B. The user manually sets up the objective device.

The user turns on the power supply 192 of the objective device 1 to start it up. Then, the user manually sets up the objective device 1. In this embodiment, since the objective device 1 is the digital camera, the user manually sets up functions of the digital camera such as a shutter speed, ON/OFF of AF (auto-focus), film speed (ISO 100/400), and the like. Since the startup ROM 105 or flash ROM 106 stores a basic set of data to be set, the data set by the user (device setup data) are recorded in the RAM 102.

C. The set device setup data is registered in the user setup data recording device as user setup data.

Figure 6:
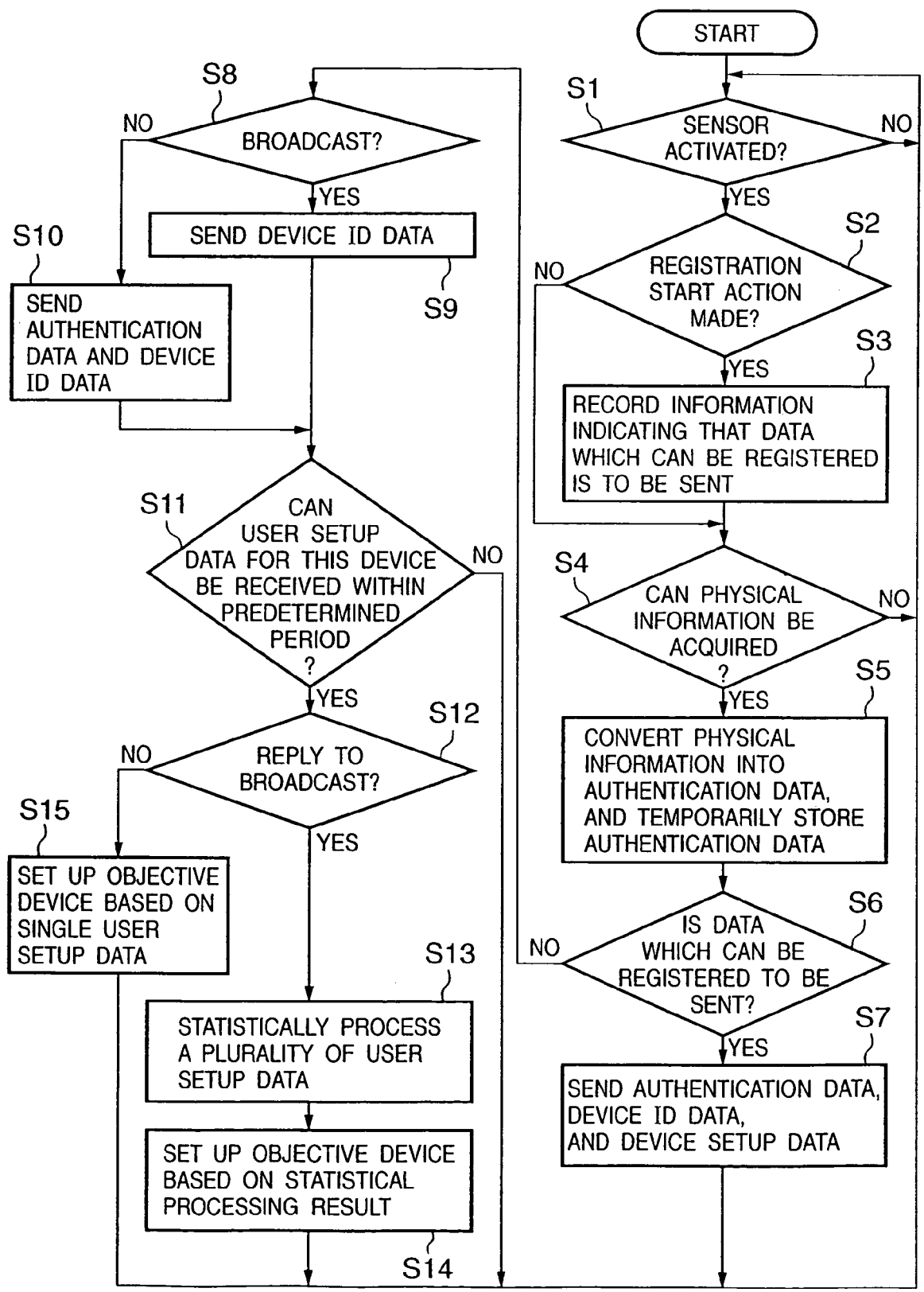
FIG. 6 is a flow chart showing the registration/setup processing sequence in the objective device.

FIG. 6 is a flow chart showing the registration/setup processing sequence in the objective device. This processing program is stored in the startup ROM 105 in the objective device 1, and is executed by the CPU 101.

After the objective device 1 is set in an initial state by turning on the power supply 192, the user sets up the objective device, and waits until the fingerprint sensor 107 operates (step S1). The user makes a registration start action, and presses the finger 4 against the fingerprint sensor 107 of the objective device 1. When the fingerprint sensor 107 is activated upon detecting touch with the finger 4, it checks if the registration start action has been made (step S2).

As the registration start action, for example, the user presses the finger 4 against the fingerprint sensor 107 while pressing a registration button equipped on the objective device 1, or the user taps the fingerprint sensor 107 twice, and presses the finger 4 against the fingerprint sensor 107 within 5 sec after the second tapping. Note that the registration start action is not particularly limited as long as it allows the user to explicitly instruct registration.

In this case, assume that the registration start action has been made, and the objective device 1 records information indicating that data which can be registered is to be sent (step S3). On the other hand, if the registration start action has not been made, the flow jumps to step S4.

The objective device 1 checks if the fingerprint sensor 107 can acquire user's physical information (fingerprint) (step S4). If the physical information can be acquired, the read physical information is temporarily recorded in the RAM 102, is converted into authentication data by the data converter 104, and the converted data is recorded in the RAM 102 (step S5). Note that the physical information may be directly used as authentication data without being converted, and the data conversion process may be skipped. In this case, the physical information must be recorded by the same method as that when authentication data is recorded in the user setup data recording device 2. When the CPU 101 can perform data conversion, the data converter 104 may be omitted. Furthermore, the data conversion process may include a security process such as encryption or the like. The converted authentication data is stored in the RAM 102.

Note that by the process in step S3 the RAM 102 records information indicating whether or not the user wants to register. More specifically, information indicating whether or not the user has made registration is recorded. Also, the RAM 102 records user's authentication data by the process in step S5.

The objective device 1 checks with reference to data, which is stored in the RAM 102 and indicates whether or not registration has been made, if the authentication data is sent as data that can be registered (step S6).

In this case, since the user has made the registration action, and data that can be registered is to be sent, the authentication data stored in the RAM 102, device ID data registered by the manufacturer of the objective device in the startup ROM 105 or flash ROM 106, and device setup data manually set in the RAM 102 by the user are sent to the user setup data recording device 2 (step S7). FIG. 7 shows data to be sent from the objective device to the user setup data recording device upon registration.

Figure 8:
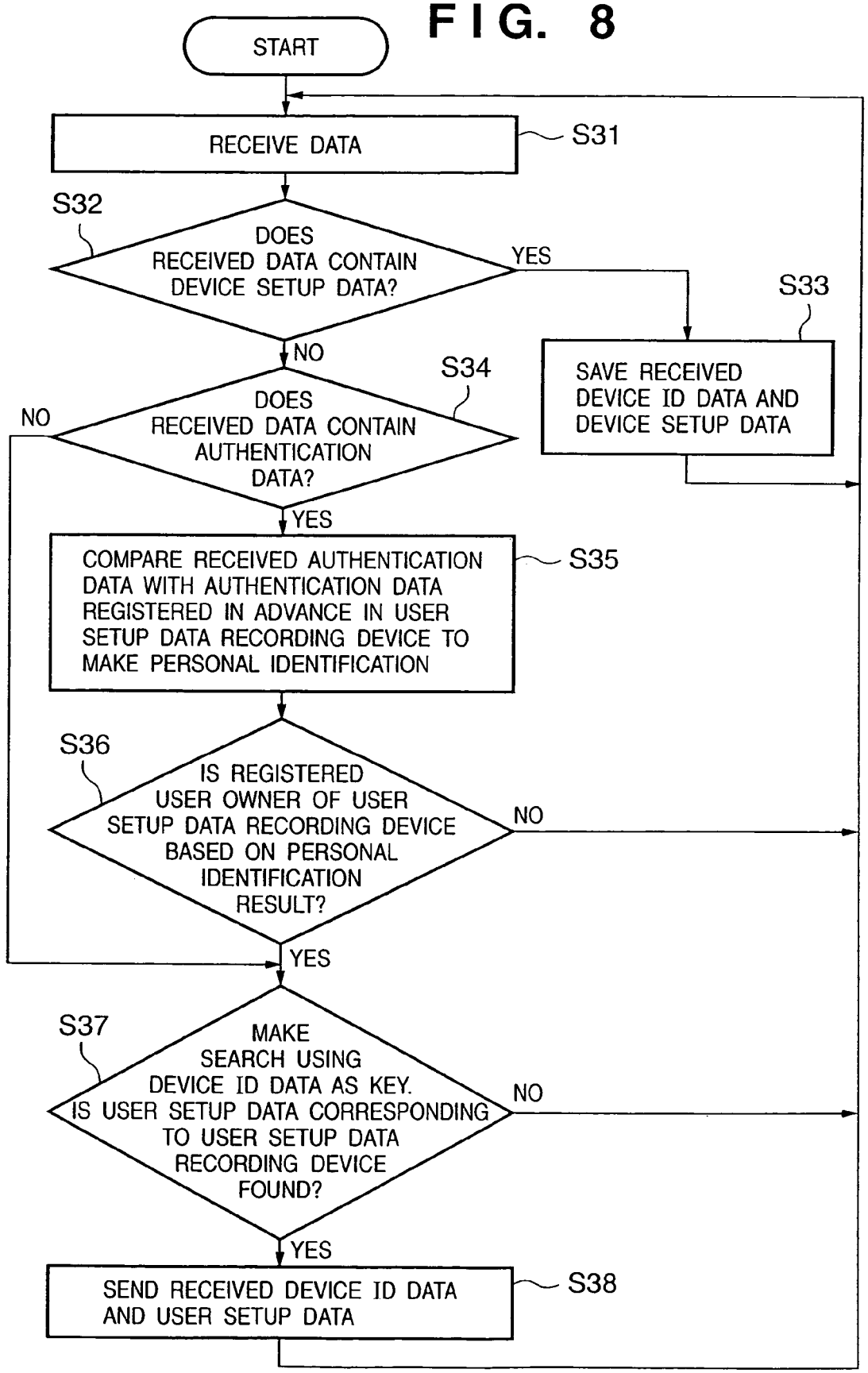
FIG. 8 is a flow chart showing the registration/setup processing sequence in the user setup data recording device.

FIG. 8 is a flow chart showing the registration/setup processing sequence in the user setup data recording device. This processing program is stored in the startup ROM 204 in the user setup data recording device 2, and is executed by the CPU 201.

The user setup data recording device 2 is in an initial state. Upon receiving data sent from the objective device 1 (step S31), it is checked if the received data contains device setup data (step S32). If the device setup data is contained, that data is recorded in the user setup data recording device 2 as user setup data. The user setup data recording device 2 searches the contents of the flash ROM 203 using the received device ID data as a key, and if user setup data has already been recorded in correspondence with the received device ID, the device 2 overwrites the received device setup data on that user setup data (step S33). If user setup data corresponding to the received device ID is not found, the device setup data is recorded in the flash ROM 203 in correspondence with the received device ID (step S33). After that, the flow returns to step S31.

[Re-Setup Process]

Figure 9A:
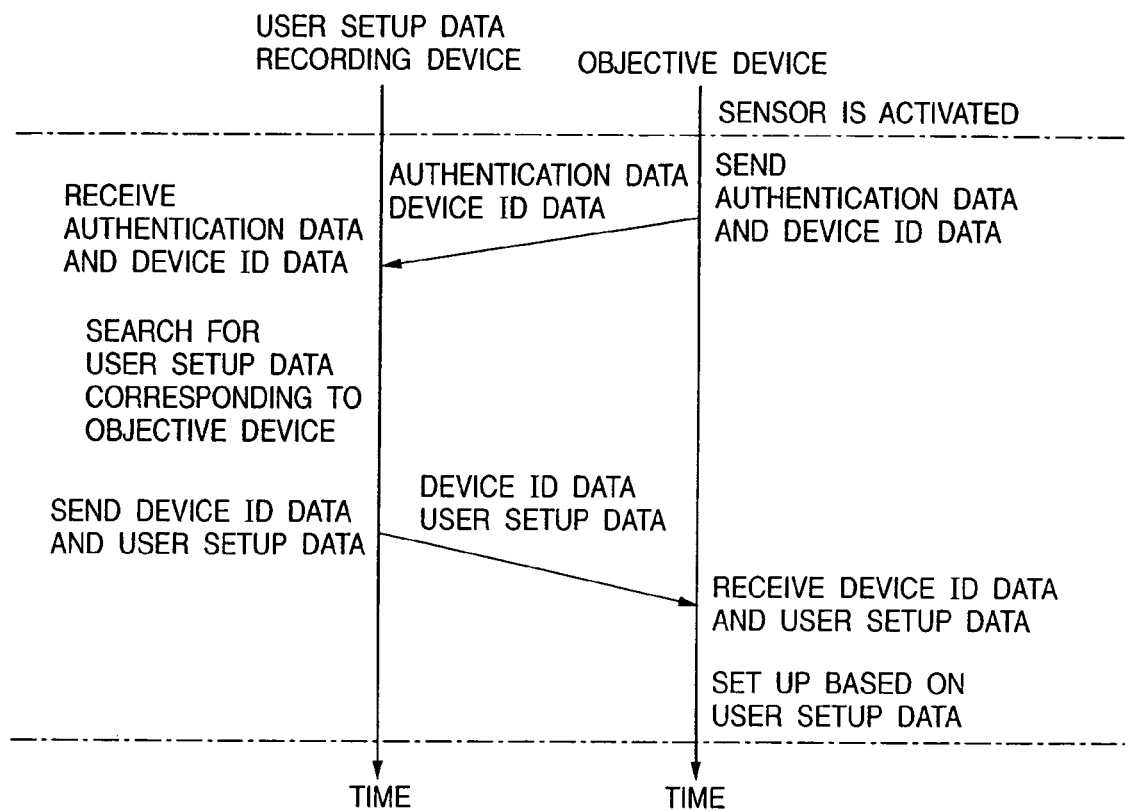
FIGS. 9A and 9B are timeline diagrams between devices upon setting user setup data again.
Figure 9B:
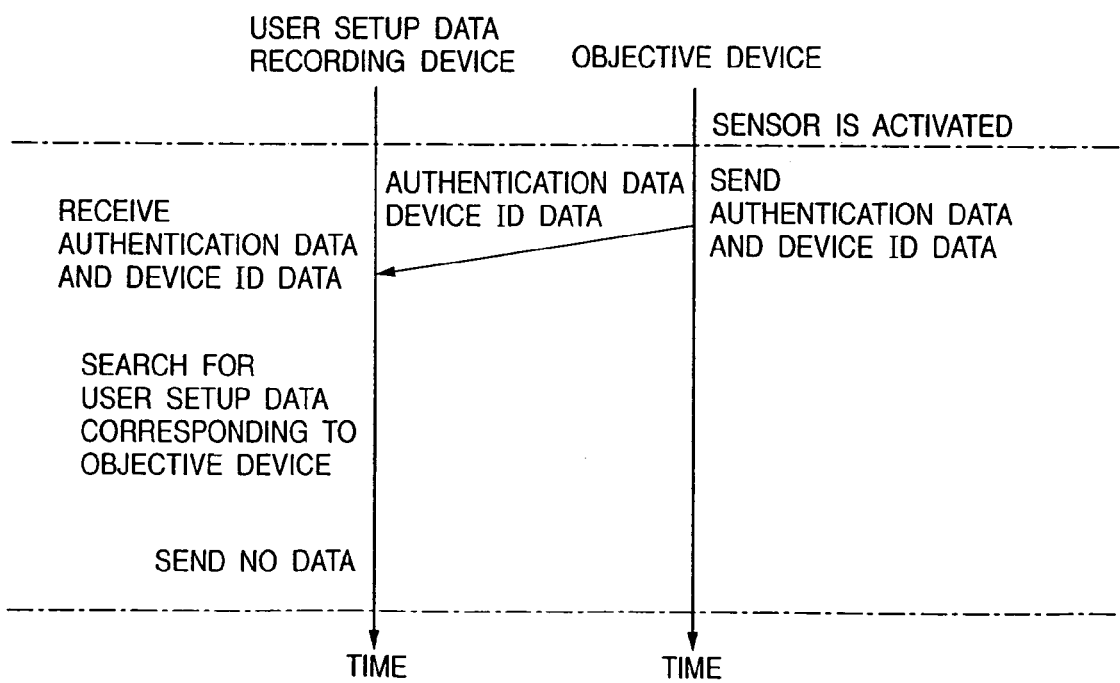

The overall process upon setting again the user setup data stored in the user setup data recording device 2 in the objective device 1 will be explained below. FIGS. 9A and 9B are timeline diagrams between the devices upon setting user setup data again. FIG. 9A shows a case wherein the objective device has already stored corresponding user setup data, and FIG. 9B shows a case wherein the objective device does not store any corresponding user setup data.

The objective device 1 reads physical information data. The read data is converted into authentication data. If the objective device 1 can broadcast data, it sends only device ID data. Note that "broadcast" means communications with all of a plurality of user setup data recording devices 2 that can communicate with the objective device 1 if such devices 2 are present around the device 1. If the objective device 1 does not broadcast data, it sends the authentication data and device ID data. The objective device 1 records information indicating if it broadcasted data.

The user setup data recording device 2 searches data in the user setup data recording device 2 using the received device ID data as a key. If user setup data corresponding to the objective device 1 is found, the device 2 sends that user setup data and device ID data. On the other hand, if user setup data corresponding to the objective device 1 is not found, the device 2 sends no data.

If the objective device 1 broadcasts data, it receives a plurality of replies. The CPU 101 of the objective device 1 statistically processes a plurality of received user setup data, and sets the statistically processed setup data again. On the other hand, if the objective device 1 does not broadcast data, since it receives only one data, the device 1 makes a re-setup process based on the single user setup data. Such re-setup process is done in the following steps D, E, and F.

D. The objective device 1 sends device ID data alone or device ID data and authentication data to the user setup data recording device 2.

As shown in FIG. 6 above, the user sets the objective device 1 in an initial state by turning on its power supply 192. The user presses the finger 4 against the fingerprint sensor 107 of the objective device 1. When the fingerprint sensor 107 is activated upon detecting touch with the finger 4 (step S1), it checks if a registration start action has been done (step S2). In this case, assume that the registration start action has not been done. Since the fingerprint sensor 107 is combined with the shutter button 8, as shown in FIG. 3A, the user touches the fingerprint sensor 107 which starts the re-setup process without his or her knowledge. Note that the user turns off the fingerprint sensor 107 in advance when he or she does not want to set data again.

As described above, since the registration start action is not made in this case, it is directly checked if physical information can be read (step S4). If read has failed, the control returns to the initial state. On the other hand, if read has succeeded, the read data is temporarily saved in the RAM 102, and is converted into authentication data by the data converter 104 (step S5). If fingerprint information is directly used in personal identification without being converted into authentication data, this data conversion process may be skipped. When the CPU 101 can perform data conversion, the data converter 104 may be omitted. Furthermore, the data conversion process may include a security process such as encryption. The converted authentication data is stored in the RAM 102.

Since the registration start action has not been made, it is determined in step S6 that the data which can be registered is not to be sent, and the objective device 1 then checks if it broadcasts device ID data (step S8). Broadcast is made when the objective device 1 collects favors of a plurality of users, and sets data again by statistically processing the collected favors. Whether or not broadcast is made is determined by the manufacturer of the objective device 1. For example, as the objective device 1 that may be used in a situation wherein broadcast is made, an air conditioner may be used. Note that the user may select whether or not broadcast is to be made.

If broadcast is made, only the device ID data is sent (step S9). Data to be sent is obtained by excluding authentication data from data shown in FIG. 10 (to be described later). The objective device 1 records information indicating if broadcast has been made in the RAM 102. Whether or not broadcast is made is expressed by whether authentication data is appended or not to data to be transmitted.

On the other hand, if broadcast is not made, the objective device 1 sends the authentication data stored in the RAM 102, and device ID data stored in the startup ROM 105 or flash ROM 106 to the user setup data recording device 2 (step S10). FIG. 10 shows data to be sent from the objective device to the user setup data recording device when broadcast is not made.

Since this embodiment uses a wireless communication means, if data is merely sent using an identical frequency, data is distributed to all objective devices 1 and user setup data recording devices 2 which are present around the source objective device 1.

Therefore, in this embodiment, when authentication data is appended to data to be sent by the objective device 1, the user setup data recording device 2 compares the received authentication data and that held in advance, and if the two data match, the device 2 starts the search process; if they do not match, the device 2 discards the received data. If authentication data is not contained in data sent by the objective device 1, it is determined that the data is broadcast data, and the device 2 unconditionally starts the search process. In this case, the authentication data also serves as a transmission address.

In this embodiment, since the objective device 1 is the digital camera, broadcast is not made. Upon sending data, the authentication data stored in the RAM 102 is converted into an appropriate communication protocol in the CPU 101, and is sent via the data transmitter 113 and wireless I/F 111 using the wireless channel 5.

E. The user setup data recording device 2 searches for user setup data corresponding to the objective device 1, and if user setup data corresponding to the objective device 1 is found, the device 2 sends that data; if corresponding data is not found, the device 2 sends no data.

As shown in FIG. 8 above, the user setup data recording device 2 is in an initial state. Upon receiving the sent data (step S31), it is checked if the received data contains device setup data (step S32). If device setup data is not contained, the user setup data recording device 2 sends corresponding data to the objective device 1.

It is then checked if the received data contains authentication data (step S34). If the authentication data is contained, the received authentication data is collated with that which has already been registered in the flash ROM 203 (step S35). This collation is called personal identification. It is checked as a result of personal identification if two data match (step S36). If two data do not match, the control returns to the initial state, and no data is sent.

On the other hand, if it is determined as a result of personal identification that two data match, i.e., if it is determined that the user setup data recording device 2 belongs to the user who is currently using that device, the contents of the flash ROM 203 are searched for user setup data corresponding to the objective device 1 using the received device ID data as a key (step S37).

Since the device ID data contains the manufacturer name, product name, product category name, serial number, and the like, the search is made using them as keywords. Normally, the best way of making the search is to use the product name as a keyword. This is because even products of an identical model, which have different serial numbers, may use user setup data. However, the serial number or product category may be used in comparison. The manufacturer of the user setup data recording device 2 may determine device ID data to be used in the search or the user may select it.

As a result of search in step S37, if corresponding user setup data is not found, the control returns to the initial state, and no data is sent. On the other hand, if corresponding user setup data is found, the found user setup data and device ID data are sent (step S38). After that, the control returns to the initial state. FIG. 11 shows data to be sent from the user setup data recording device to the objective device as a reply upon setting.

The received authentication data matches only for a user whose physical information has been acquired by the fingerprint sensor. As a result, even if a plurality of user setup data recording devices 2 are present around the objective device 1, data can be consequently sent to the user setup data recording device 2 of a desired user.

F. When the objective device 1 can receive user setup data within a given period, it executes a re-setup process on the basis of that user setup data.

As shown in FIG. 6 above, the objective device 1 waits for reception of user setup data within a predetermined period of time (step S11). If user setup data cannot be received, the control returns to the initial state; otherwise, it is checked if the received data is a reply to broadcast (step S12).

The objective device 1 recorded in the RAM 102 information indicating if it broadcasted. Hence, if the objective device 1 broadcasted, the received data is processed as a reply to broadcast; otherwise, the received data is processed as a reply from a single user.

In step S12, the objective device 1 compares to check if device ID data contained in the received data matches its own device ID data. If the two data match, since the received data is a reply to the data sent by the objective device 1 itself, the subsequent process is executed; otherwise, the received data is discarded. Note that items of the device ID data to be actually compared are not specified in the above description, but they may be determined by the manufacturer of the user setup data recording device 2 or may be of user's choice.

If broadcast was made, a plurality of received user setup data are statistically processed (step S13), and the objective device 1 executes a re-setup process based on the statistical processing result (step S14). After that, the control returns to the initial state. On the other hand, if broadcast was not made, the objective device 1 executes a re-setup process based on the received user setup data (step S15), and the control returns to the initial state. In this embodiment, since broadcast was not made, the digital camera executes a re-setup process according to user's favor with reference to the user setup data (FIG. 11) sent from the user setup data recording device 2.

Second Embodiment

In the first embodiment, upon registration in the objective device, the user makes a registration start action first, then presses a finger against the sensor to generate authentication data, and sends the data. Conversely, the user may press a finger against the sensor to generate authentication data, and that data may be sent after a registration start action is made. In the second embodiment, the latter case will be explained in detail below.

Figure 12:
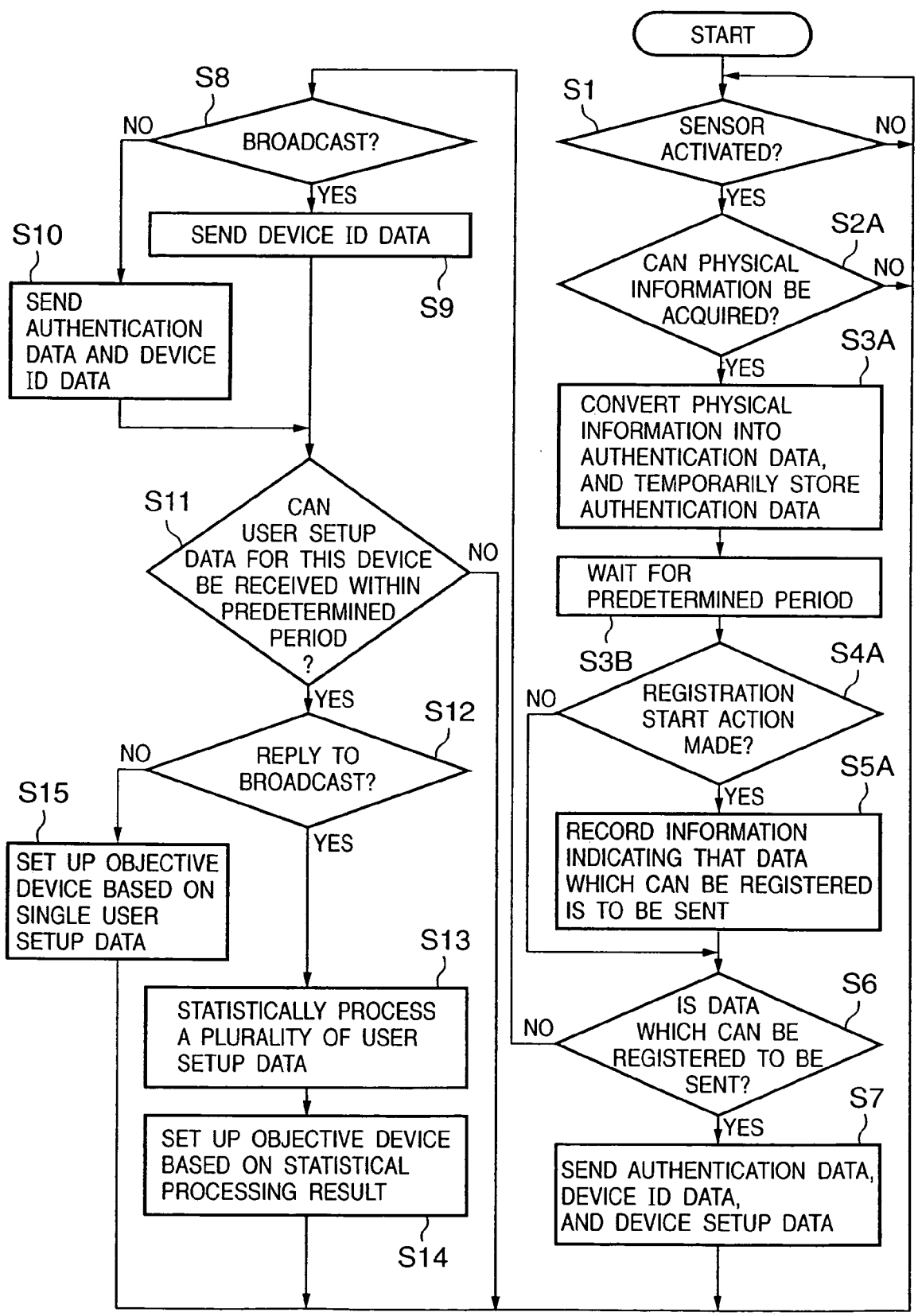
FIG. 12 is a flow chart showing the registration/setup processing sequence in the second embodiment.

Since an information setting system of the second embodiment has the same arrangement as the first embodiment, and only the order of the registration start action and generation of authentication data is different from the first embodiment, only different processes will be explained. FIG. 12 is a flow chart showing the registration/setup processing sequence in the second embodiment. Since processes in step S5 and the subsequent steps are the same as those in the first embodiment, a description thereof will be omitted by assigning the same step numbers thereto.

The user presses the finger 4 against the fingerprint sensor 107 of the objective device 1 in the initial state, and waits until the fingerprint sensor 107 is activated (step S1). After the fingerprint sensor 107 is activated, it is checked if physical information (fingerprint information) can be sampled (step S2A). If physical information cannot be sampled, the flow returns to step S1.

On the other hand, if physical information (fingerprint information) can be sampled, that information is converted into authentication data, and the converted data is recorded in the RAM 102 (step S3A).

After that, the control waits for a predetermined period of time (step S3B), and it is checked if a registration start action has been made during that period (step S4A). If a registration start action has not been made during the predetermined period of time, it is determined that a re-setup process is to be done, and processes in step S6 and the subsequent steps are executed. On the other hand, if the registration start action has been made during the predetermined period of time, information indicating that data which can be registered is to be sent is recorded in the RAM 102 (step S5A), and the flow advances to step S6.

In the second embodiment, the control waits for a predetermined period of time, if the registration start action has been made during that period, information indicating that data which can be registered is to be sent is recorded in the RAM 102, and the flow advances to step S6. On the other hand, if the registration start action has not been made, the flow jumps to step S6. After a predetermined period of time, it is checked with reference to the RAM 102 if information indicating that data which can be registered is to be sent is recorded.

In this way, authentication data may be generated first, and it is then checked if the registration start action has started.

Third Embodiment

Figure 13:
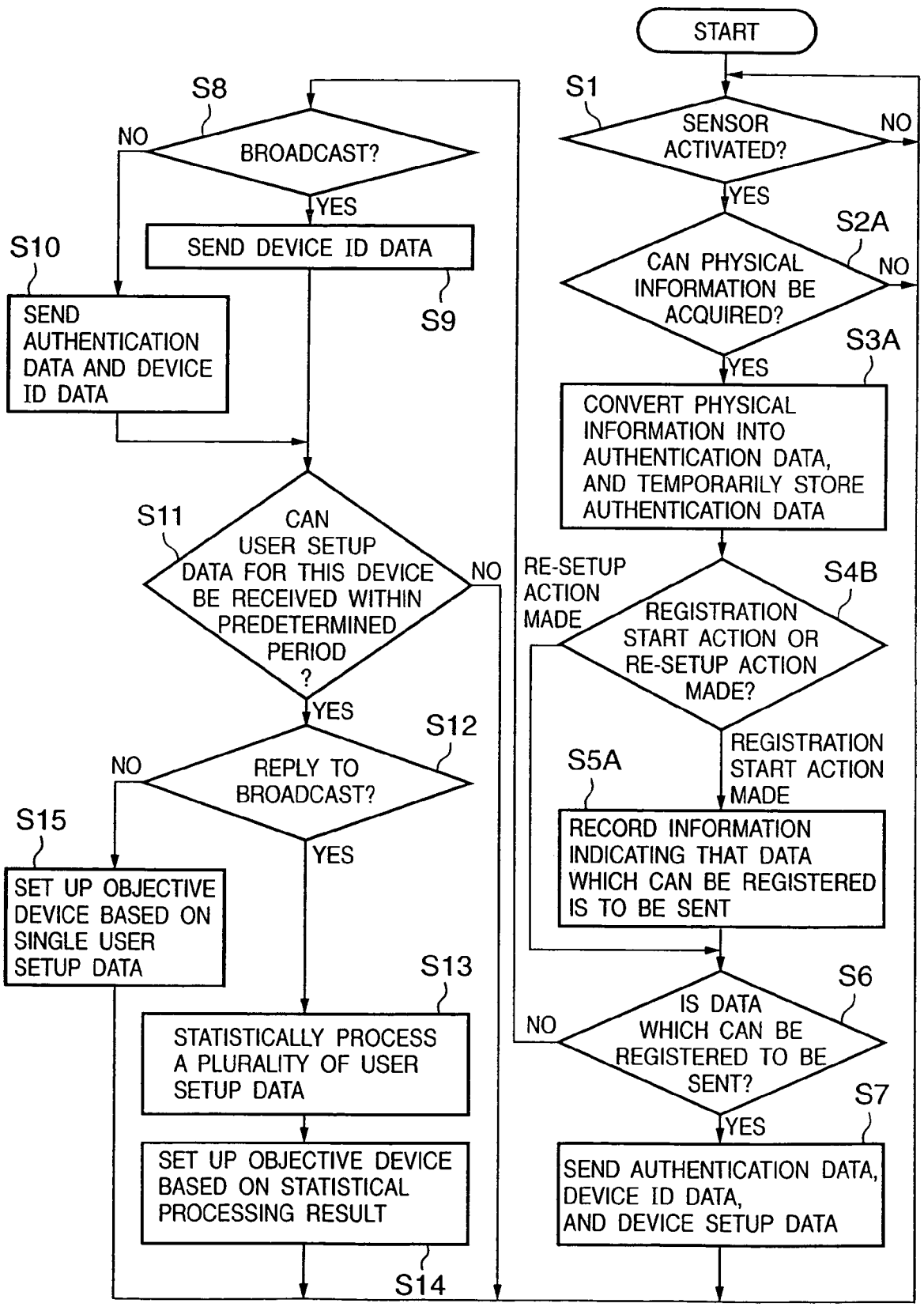
FIG. 13 is a flow chart showing the registration/setup processing sequence in the third embodiment.

In the third embodiment, the user presses the finger against the sensor to generate authentication data first, and data is sent after a registration start action is made, as in the second embodiment. FIG. 13 is a flow chart showing the registration/setup processing sequence in the third embodiment. Note that the same step numbers denote the same step processes as those in the second embodiment.

That is, after sampled physical information (fingerprint information) is converted into authentication data, and the converted data is recorded in the RAM 102 in step S3A, the control makes the user explicitly select a registration start action or re-setup action (step S4B). For example, a registration button and re-setup button are provided to the objective device 1, and the control prompts the user to press one of them.

If the user has pressed the registration button, information indicating that data which can be registered is to be sent is recorded in the RAM 102 (step S5A), and the flow advances to step S6. On the other hand, if the user has pressed the re-setup button, the flow jumps to step S6. Irrespective of the button selected by the user, the objective device 1 checks with reference to the RAM 102 in the process in step S6 if data which can be registered is to be sent.

In this manner, authentication data may be generated first, and it is then checked if the registration start action has started or if the re-setup action has been made.

Fourth Embodiment

Figure 14:
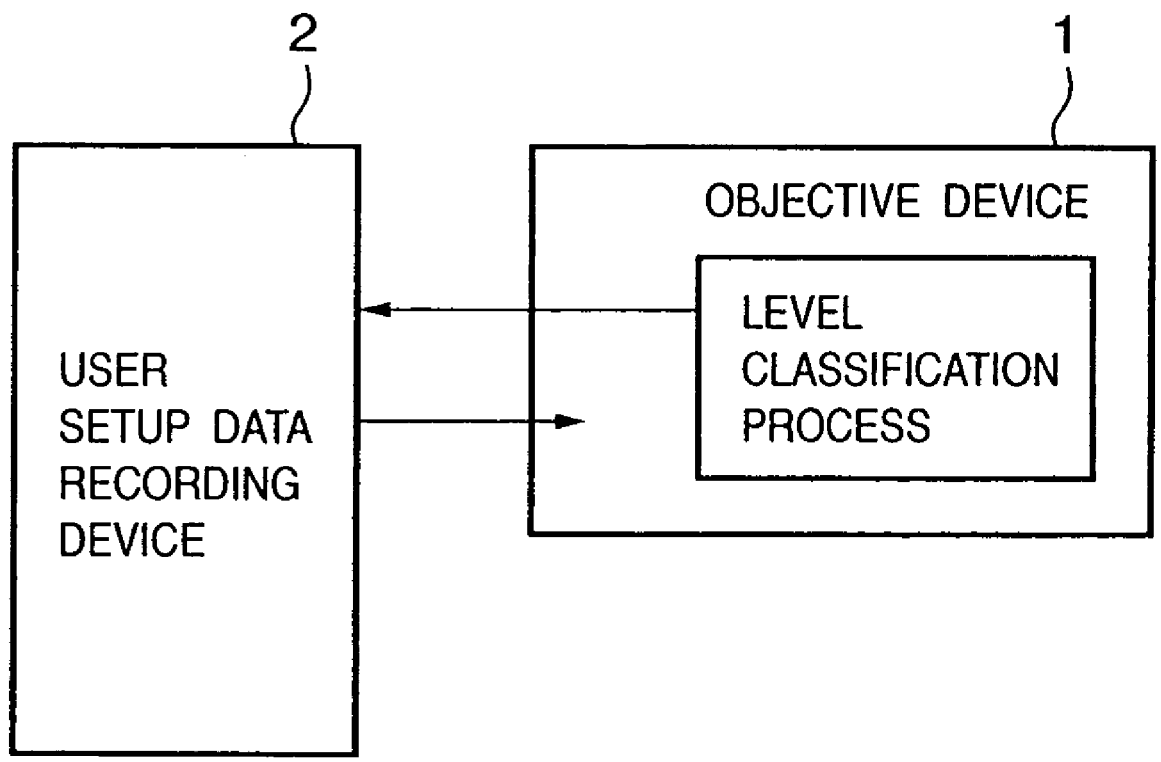
FIG. 14 is a block diagram showing characteristic functions of an information processing system according to the fourth embodiment of the present invention.

This embodiment will explain a case wherein a level classification process for identifying a user who accesses the objective device 1 and executing a different process for each user is executed, as shown in FIG. 14. A case will be explained below wherein an authentication process for the user is made as the level classification process.

Also, in this embodiment, objective devices with the arrangements shown in FIGS. 15 and 16 will be explained in addition to the objective device 1 shown in FIG. 1.

Figure 15:
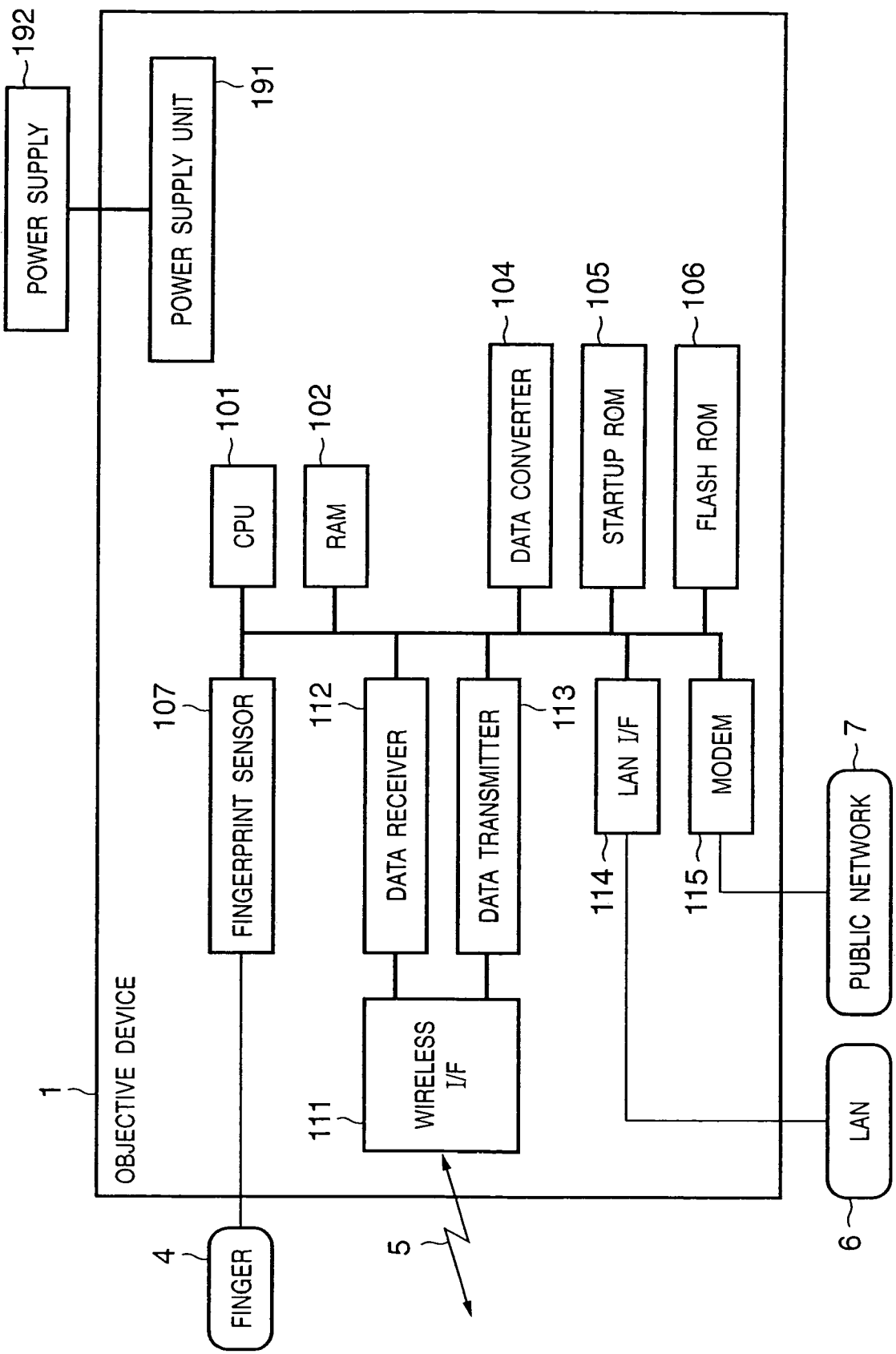
FIG. 15 is a block diagram showing another arrangement of an objective device 1.

In the arrangement of an objective device 1 shown in FIG. 15, a LAN I/F 114 and modem 115 are added to the arrangement shown in FIG. 1, and the pattern matching unit 103 is excluded therefrom.

Figure 16:
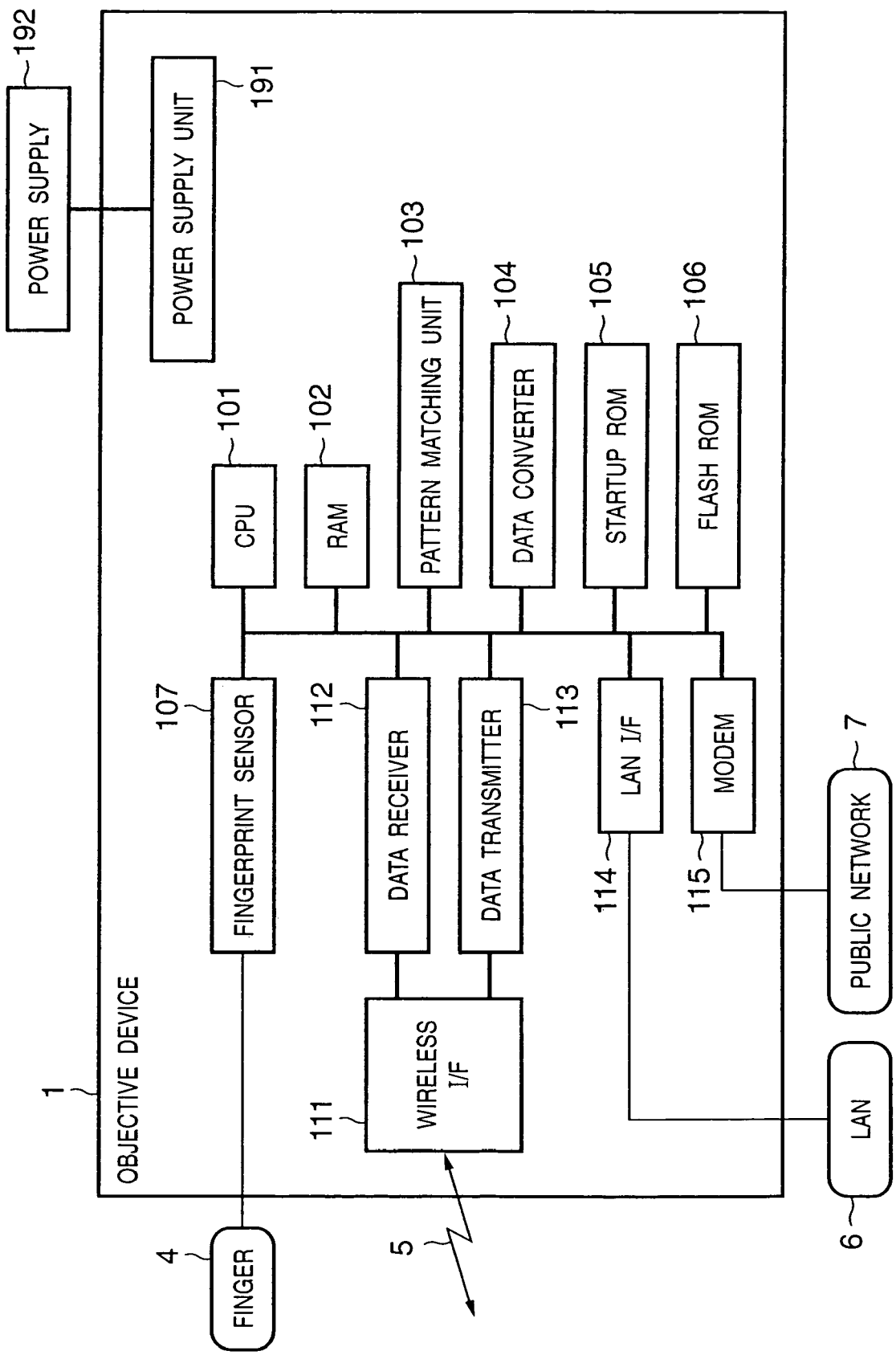
FIG. 16 is a block diagram showing still another arrangement of the objective device 1.

In the arrangement of an objective device 1 shown in FIG. 16, a LAN I/F 114 and modem 115 are added to the arrangement shown in FIG. 1.

The arrangement of the objective device 1 changes slightly depending on whether to execute the level classification process inside or outside the objective device. When the level classification process is executed internally, any of the arrangements shown in FIGS. 1, 15, and 16 can be used; when the level classification process is executed externally, either the arrangement shown in FIG. 15 or 16 is used. Of course, when the level classification process is externally executed via a wireless channel without using the LAN I/F 114 and modem 115, any of the arrangements shown in FIGS. 1, 15, and 16 may be used.

Figure 17:
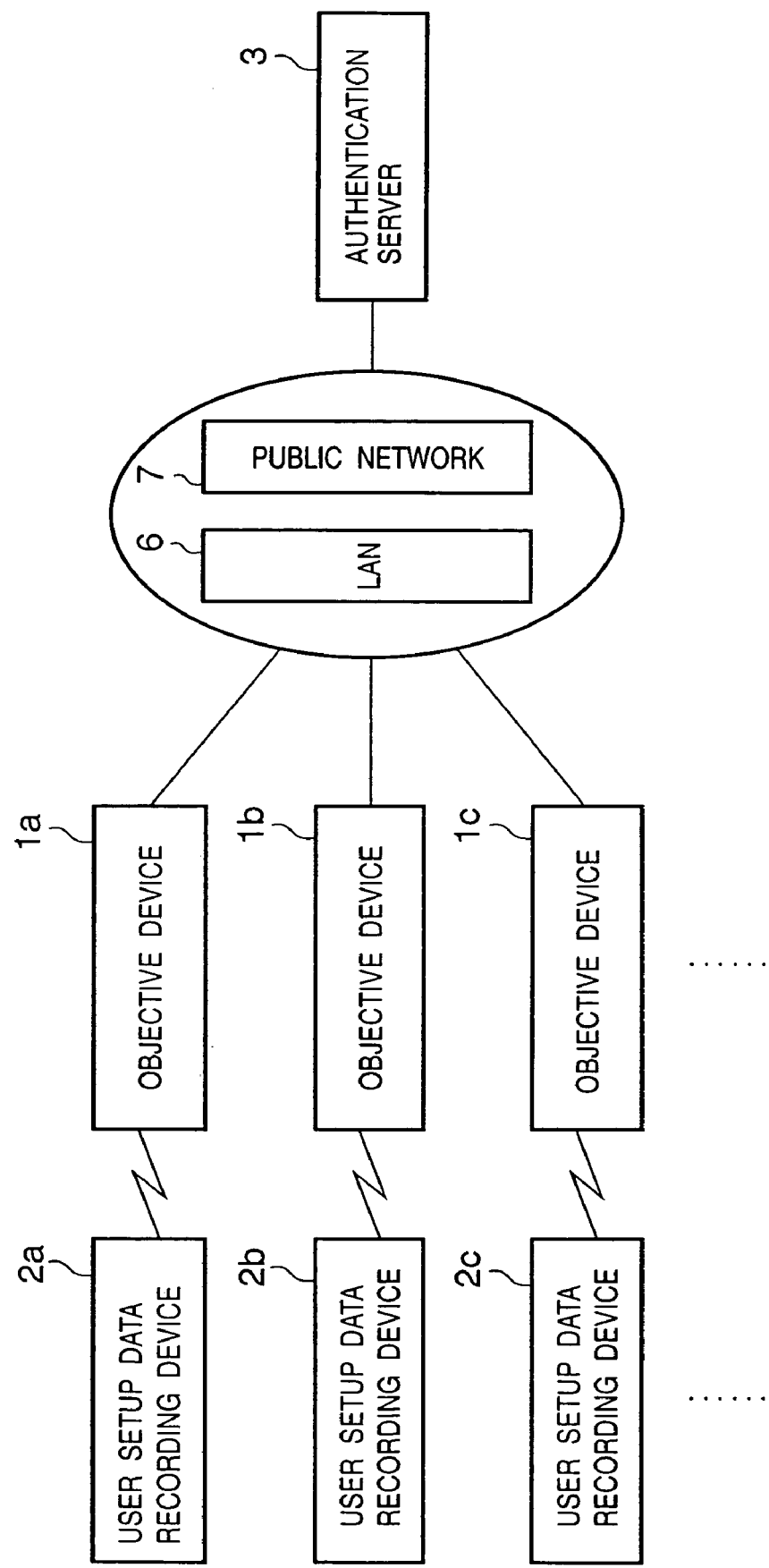
FIG. 17 is a block diagram showing the overall arrangement of a system upon externally executing a level classification process according to each embodiment.
Figure 18:
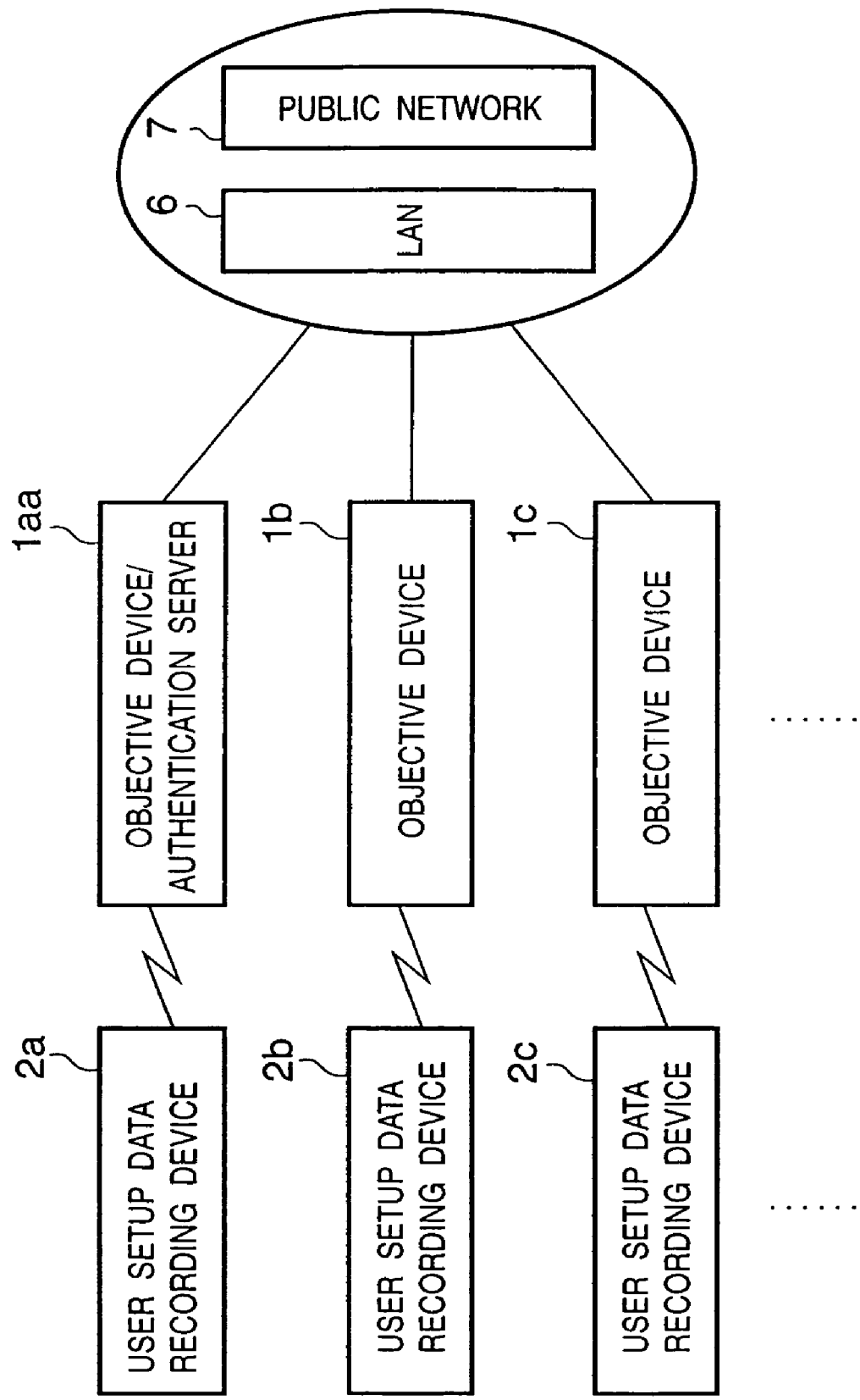
FIG. 18 is a block diagram showing the overall arrangement of a system upon externally executing a level classification process according to each embodiment.

When the level classification process is executed internally, the arrangement of the overall system including the objective device 1 and user setup data recording device 2 is the same as that shown in FIG. 4. However, when the level classification process is executed externally, the arrangement shown in FIG. 17 or 18 is adopted. In the overall arrangement shown in FIG. 4, objective devices 1a, 1b, 1c, . . . and user setup data recording devices 2a, 2b, 2c, . . . are connected to each other via wireless channels. In the overall arrangement shown in FIG. 17, objective devices 1a, 1b, 1c, . . . are connected to the authentication server 3 via a LAN (Local Area Network) 6 or public network 7. In the arrangement shown in FIG. 18, an objective device/authentication server 1aa is provided in place of the authentication server 3 in the arrangement shown in FIG. 17.

The arrangement of the user setup data recording device 2 is as shown in FIG. 2.

In this embodiment as well, assume that the user wears a wristwatch type user setup data recording device 2 on a wrist. The user need not always wear the device 2 on a wrist, but must hold it at a position where the device 2 can communicate with the objective device 1. A digital camera incorporates the objective device 1, and is adjusted according to setup data received from the user setup data recording device 2 by operating motors and the like based on the received setup data.

In this embodiment, the digital camera and wristwatch are assumed as forms of the objective device 1 and user setup data recording device 2. However, the present invention can be used when they have other forms. For example, examples of the objective device 1 include an illumination appliance, sound system, seat, and the like in addition to the digital camera, and examples of the user setup data recording device 2 include a portable telephone, PDA (Personal Digital Assistant), portable music player, and the like. Note that items of device setup data exchanged between the objective device 1 and user setup data recording device 2 differ depending on the types of objective devices 1. For example, when the objective device 1 is a sound device, items "tone volume", "surround mode type (film theater, hall, and the like)", "loudspeaker direction", and the like are used in place of items "shutter speed", "AF ON/OFF", and the like.

The operation of the objective device 1 according to this embodiment will be described below with reference to the flow charts in FIGS. 19 and 20. Note that the operation of the user setup data recording device 2 is the same as that explained above with reference to FIG. 8. Also, the registration operation is the same as that in the first embodiment.

<Re-Setup Operation>

The re-setup operation of this embodiment will be described below.

The flow of overall processes executed in the re-setup operation will be briefly explained first.

The objective device 1 reads physical information data. The read data is converted into authentication data. An authentication process is done to authenticate if the user has the right of use of the objective device 1. When broadcast is to be made, device ID data alone is sent; when broadcast is not to be made, authentication data and device ID data are sent. The objective device 1 records information indicating that it broadcasted data or sent data to a plurality of users.

The user setup data recording device 2 searches data therein using the received device ID data as a key. If user setup data corresponding to the objective device 1 is found, the device 2 sends that data and device ID data; if such data is not found, the device 2 sends no data.

If the objective device 1 broadcasted or sent data to a plurality of users, it receives a plurality of replies. The objective device 1 statistically processes a plurality of received user setup data, and executes a re-setup process based on the statistical processing result. If the objective device 1 neither broadcasted nor sent data to a plurality of users, since it receives only one data, the device 1 executes a re-setup process on the basis of single user setup data.

The flow of the re-setup process will be described in detail below.

The timeline diagram between the devices in the re-setup process is the same as that shown in FIG. 9.

(1) Generation of Authentication Data by Objective Device 1

Figure 19:
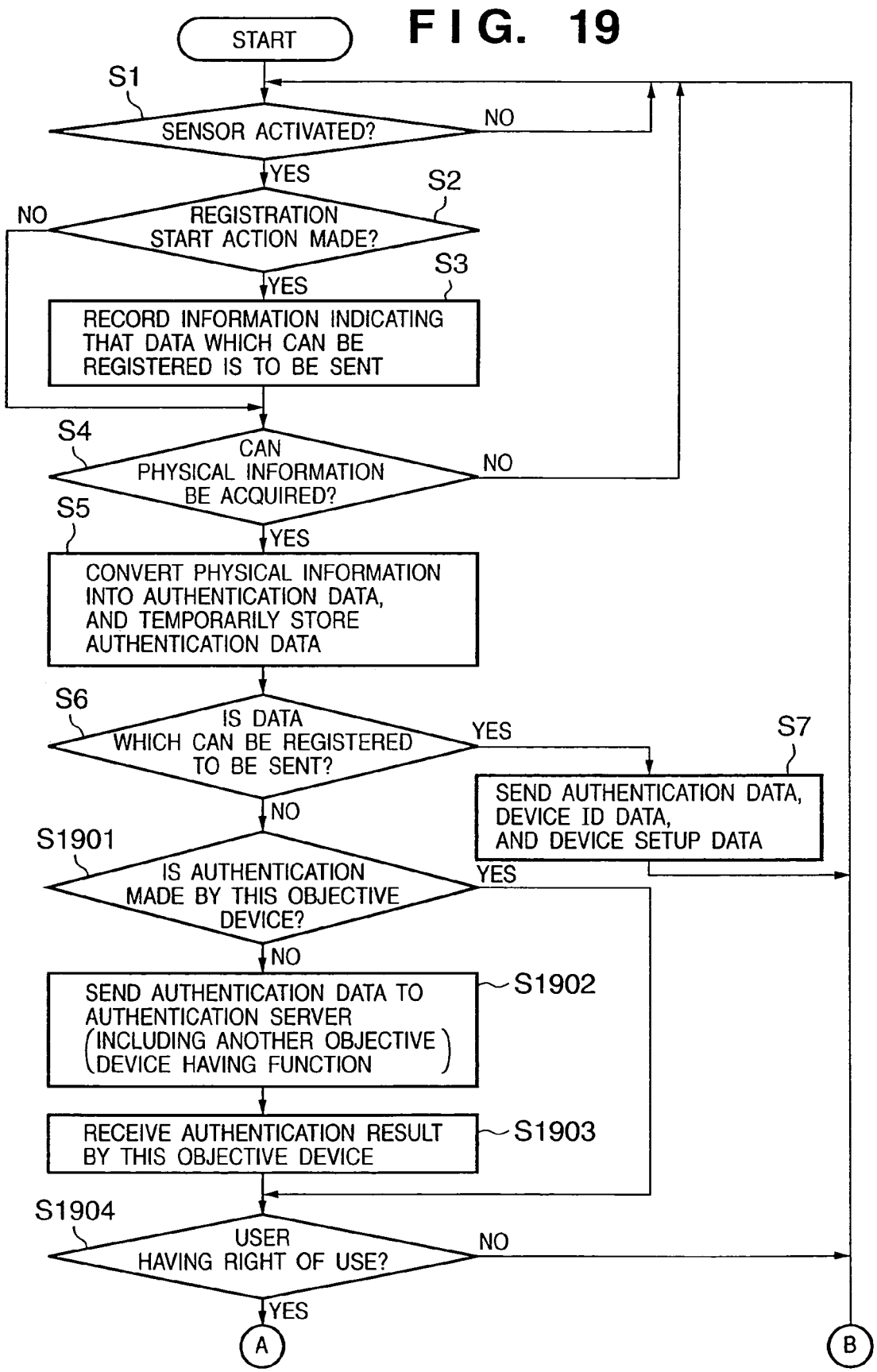
FIG. 19 is a flow chart showing the operation of the objective device 1 of the fourth to ninth embodiments.

Referring to FIG. 19, the objective device 1 is set in an initial state by turning on the power supply 192. The user presses the finger 4 against the fingerprint sensor 107 of the objective device 1. The fingerprint sensor 107 is activated by detecting that touch (step S1) After the sensor 107 is activated, it is checked if a registration start action has been made (step S2). Assume that a registration start action has not been made in this case.

When the fingerprint sensor 107 is combined with a shutter button, the user can start a setup process by touching the fingerprint sensor 107 without his or her deliberate action. Of course, when the user does not want to execute a re-setup process proposed by the present invention, he or she need only turn off the sensor.

Physical information is then read (step S4). If read has failed, the control returns to the initial state. On the other hand, if read has succeeded, the read data is temporarily saved in the RAM 102, and is converted into authentication data by the data converter 104 (step S5). If fingerprint information is directly used in personal identification without being converted into authentication data, this data conversion process may be skipped. When the CPU 101 can perform data conversion, the data converter 104 may be omitted. Furthermore, the data conversion process may include a security process such as encryption. The converted authentication data is stored in the RAM 102.

(2) Authentication Process of Objective Device 1

An authentication process is done inside or outside the objective device 1. When the authentication process is done inside the objective device 1, e.g., when fingerprint authentication is done using the pattern matching unit 103, the objective device 1 must have the arrangement shown in FIG. 1 or 16. If authentication is done by the CPU 101 without using the pattern matching unit 103, any of the arrangements shown in FIGS. 1, 15, and 16 may be used irrespective of the presence/absence of the pattern matching unit 103.

When the authentication process is done outside the objective device 1 using the LAN 6, public network 7, or wireless channel 5, a device that executes fingerprint authentication such as the authentication server 3 in FIG. 17 or the objective device/authentication server 1aa in FIG. 18 is required on the network, and the objective device 1 must have a function capable of accessing such device. When fingerprint authentication is externally executed, the objective device 1 is added with components such as a LAN I/F 114, modem 115, and the like if necessary. Of course, if the objective device 1 can communicate with the authentication server 3 using the wireless I/F 111, the need for the LAN I/F 114, modem 115, and the like can be obviated. That is, when the authentication process is executed outside the objective device 1, the authentication server 3 need only communicate with the objective device 1.

A supervisor of the objective device 1 must set in the objective device 1 information indicating whether fingerprint authentication is done inside or outside the objective device 1, in correspondence with the structure and operating environment of the objective device 1. In step S1901, this information is checked. Assume that the objective device 1 itself or the external authentication server 3 (including another objective device 1 having an authentication server function) includes a database shown in, e.g., FIG. 21.

When fingerprint authentication is executed inside the objective device 1, the pattern matching unit 103 compares authentication data, which is generated by acquiring fingerprint information by the sensor and is stored in the RAM 102, with authentication data, which are already registered in the flash ROM 106, thereby checking if the user who operates the objective device 1 has the right of use of the objective device 1 (step S1904). If the flash ROM 106 stores authentication data which matches that in the RAM 102, the user has the right of use of the objective device 1; otherwise, the user does not have such right.

If fingerprint authentication is done outside the objective device 1, the objective device 1 sends the authentication data to the authentication server 3 or objective device/authentication server 1aa (step S1902). The authentication server 3 or objective device/authentication server 1aa receives the authentication data, authenticates by comparing it with authentication data which are registered in advance, and sends the authentication result to the source objective device 1. The objective device 1 receives the fingerprint authentication result (step S1903). It is checked based on the received result if the user has the right of use (step S1904). If the user has the right of use, the flow advances to step S2001 in FIG. 20; otherwise, the control returns to the initial state.

(3) Transmission of Device ID Data Alone or Device ID Data and Authentication Data by Objective Device 1

The objective device 1 then checks if it broadcasts device ID data (step S2001). Note that "broadcast" means communications with all of a plurality of user setup data recording devices 2 that can communicate with the objective device 1 if such devices 2 are present around the device 1.

Broadcast is made when the objective device 1 collects favors of a plurality of users, and executes a re-setup process by statistically processing the collected favors. Whether or not broadcast is to be made is determined by the manufacturer of the objective device 1. As the objective device 1 that may be used in a situation wherein broadcast is made, an air conditioner may be used. Note that the user may select whether or not broadcast is to be made.

If broadcast is not to be made, the objective device 1 sends the authentication data stored in the ROM 102 and device ID data stored in the startup ROM 105 or flash ROM 106 to the user setup data recording device 2 (step S2003). Data to be sent is as shown in FIG. 10.

If broadcast is to be made, the objective device 1 sends device ID data alone. Data to be sent in this case is obtained by excluding authentication data from that shown in FIG. 10. Also, various other broadcast processes may be used. For example, if a predetermined field of data to be sent stores text "broadcast", it can be determined that the data is broadcasted. Also, a flag which is set upon broadcasting may be prepared as one item of transmission data, and if that flag is 1, it may be determined that the data is broadcast data; otherwise, the data is not broadcast data.

The objective device 1 records in the RAM 102 information indicating if broadcast was made. Whether or not broadcast is made is expressed by whether authentication data is appended or not to data to be transmitted. Since this embodiment uses a wireless communication means, if data is merely sent using an identical frequency, data is distributed to all objective devices 1 and user setup data recording devices 2 which are present around the source objective device 1.

Therefore, in this embodiment, when authentication data is appended to data to be sent by the objective device 1, the user setup data recording device 2 compares the received authentication data and that held in advance, and if the two data match, the device 2 starts the search process; if they do not match, the device 2 discards the received data. Upon receiving broadcast data which does not contain any authentication data and in which the broadcast flag is set, the device 2 unconditionally starts the search process.

In this way, the authentication data also serves as a transmission address.

In this embodiment, assume that broadcast is not made. Upon sending data, the authentication data stored in the RAM 102 is converted into an appropriate communication protocol in the CPU 101, and is sent via the data transmitter 113 and wireless I/F 111 using the wireless channel 5.

After the data is sent (step S2003), it is checked if identical device ID data is to be sent to a plurality of users (step S2004). The checking process in step S2004 is effective when the setups of only given group members are to be reflected in a given objective device 1 in place of setups of unspecified users within the communication range of the objective device 1. This process is equivalent to checking in the Internet environment if unicast is to be done a plurality of number of times.

If it is determined in step S2004 that the data is to be sent to a plurality of users, the authentication data is replaced by that for the group members (step S2005), and the replaced data is sent (step S2003). The authentication data for the group members is set in advance in the objective device 1. In this embodiment, assume that data is not sent to a plurality of users.

Upon receiving the device ID data and the like sent from the objective device 1, the user setup data recording device 2 sends back user setup data by executing the processes shown in FIG. 8.

The objective device 1 checks if it can receive the user setup data sent from the user setup data recording device 2 within a predetermined period (step S2006). If the objective device 1 cannot receive any data within the predetermined period, the control returns to the initial state without any process.

If the objective device 1 receives the user setup data, it checks based on information which is recorded in the ROM 102 and indicates whether or not it broadcasted data or sent data to a plurality of users if the received user setup data is a reply to the broadcast data or from the plurality of users, or a reply from a single user (step S2007).

The objective device 1 compares if device ID data contained in the received data matches its own device ID data. If the two data match, since the received data is a reply to the data sent by the objective device 1 itself, the subsequent process is executed; otherwise, the received data is discarded. Note that items of the device ID data to be actually compared in a search are not specified in the above description, but they may be determined by the manufacturer of the user setup data recording device 2 or may be of user's choice.

If it is determined in step S2007 that the received data is a reply from a single user, the objective device 1 is set up again based on the received user setup data (step S2010), and the control returns to the initial state.

If the received data is a reply to the broadcast data or from the plurality of users, a statistical process of a plurality of received user setup data is executed (step S2008), and the objective device 1 is set up again based on the statistical processing result (step S2009). After that, the control returns to the initial state.

In this embodiment, since broadcast is not made, the digital camera is set up again according to user's favor with reference to the user setup data in the data which is sent from the user setup data recording device 2, as shown in FIG. 11.

Fifth Embodiment

Figure 22:
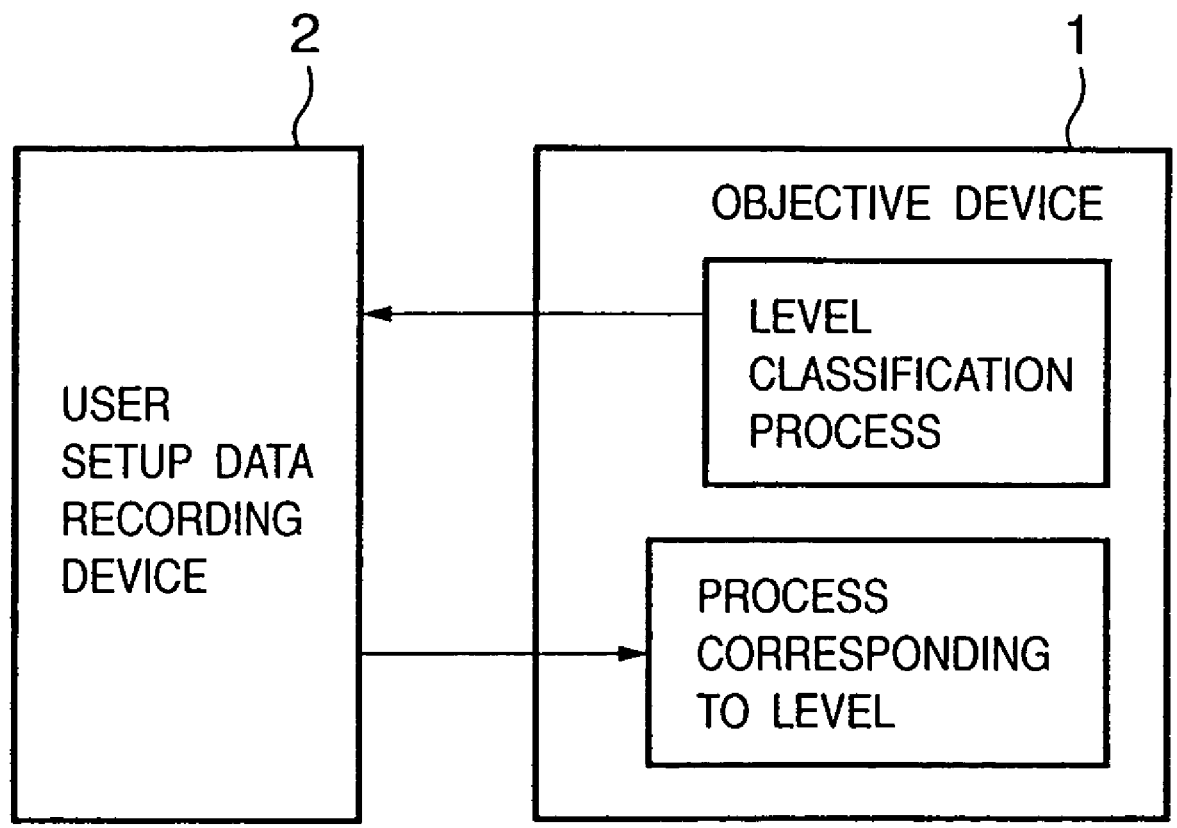
FIG. 22 is a block diagram showing characteristic functions of an information processing system according to the fourth to seventh embodiments of the present invention.

FIG. 22 is a block diagram showing characteristic functions of an information processing system according to the fifth embodiment of the present invention.

This embodiment will explain a case wherein an objective device 1 executes a process corresponding to the level of data received from a user setup data recording device 2, as shown in FIG. 22, as an example of a process for identifying a user who accesses the objective device 1, and executing a process for each user. That is, a service which is provided when a database in FIG. 23 is prepared in the user setup data recording device 2, and the objective device 1 changes its process according to data obtained by searching the database will be explained.

Figure 24:
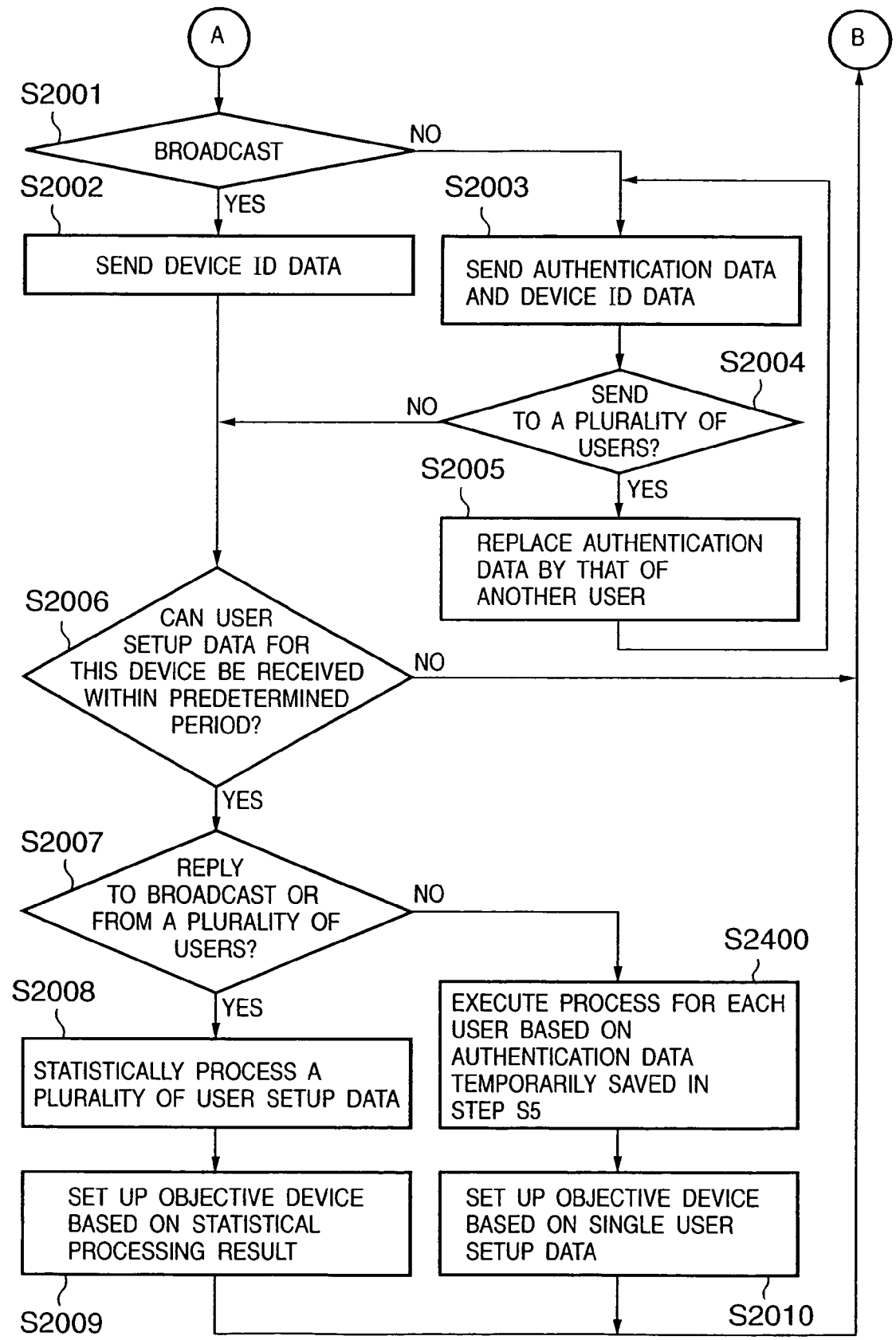
FIG. 24 is a flow chart showing the operation of an objective device 1 according to the fifth to seventh embodiments.

The flow charts showing the operation of the objective device 1 according to this embodiment use those shown in FIGS. 19 and 24. The difference between FIG. 24 and FIG. 20 used in the fourth embodiment is that a process in step S2400 is added between steps S2007 and S2010.

The aforementioned differences of this embodiment will be supplemented.

The database shown in FIG. 23 is characterized in that the user setup data recording device 2 holds use histories for respective device ID data in addition to authentication data and device ID data. The use history is updated when the fingerprint sensor 107 of the objective device 1 responds to the user, data shown in FIG. 10 is sent from the objective device 1 to the user setup data recording device 2, two authentication data match upon comparison, and user setup data is found by searching data in the user setup data recording device 2 using device ID data.

For example, assuming that the objective device 1 is a digital camera, and data shown in FIG. 10 is sent, a use history of a key which matches device ID data in FIG. 10 is incremented by 1 in the database shown in FIG. 23. More specifically, use history values corresponding to "CANON", "Digital Camera", "Auto Set", and "ASC-0000001" are incremented by 1, and are updated from 15 to 16, 20 to 21, 43 to 44, and 55 to 56, respectively. Of course, other processes such as a decrement process may be used in place of the increment process, and the increment value is not limited to 1. Assume that this process is defined in advance in the user setup data recording device 2.

When the user setup data is sent from the user setup data recording device 2 to the objective device 1, authentication data, user setup data, and use history values corresponding to respective keys of device ID data are sent together.

The objective device 1 receives data (step S2006), and checks if the received data is a reply to broadcast data or from a plurality of users (step S2007). In this embodiment, assume that the received data is not a reply to broadcast data or from a plurality of users.

The objective device 1 collates the received authentication data with that temporarily recorded in step S5 in FIG. 19 to check if the received data is a reply from the user who used the objective device 1 immediately before the current process (step S2400). If the received data is a reply from that user, a service to be provided to that user is selected with reference to the received use history (step S2400), and a setup process corresponding to the selected service is executed (step S2010). For example, a discount service for registering charge data by discounting it 20% if the use history indicates 10 times or more can be provided.

As described above, when the user setup data recording device 2 holds the database shown in FIG. 23, the following advantages are expected compared to a case wherein the database is prepared in the authentication server 3. The use history can be recorded in the user setup data recording device 2 independently of whether or not the objective device 1 is connected to the network. That is, the manufacturer that provides the objective device 1 to the user can provide services irrespective of the use environment of the objective device 1.

The main feature of this embodiment lies in that the database is held in the user setup data recording device 2. The database can record not only the use history but also the use date, location, and the like depending on the setups of processes done by the user setup data recording device 2.

With the mechanism proposed by this embodiment, the manufacturer of the objective device 1 or a provider which provides services using the objective device 1 can provide services irrespective of the setting environment of the objective device 1. Also, the use states of users can be recognized more accurately, and can be reflected in the development of products more suitable for user's needs.

Also, since use records can be automatically stored in the user setup data recording device 2 without any user's operation, the user never forgets to count the number of times of use, and can have many opportunities of receiving better services from the manufacturers and the like.

Sixth Embodiment

This embodiment will explain a case wherein a process corresponding to the level of data received from the user setup data recording device 2 is executed, e.g., data corresponding to levels are stored in the authentication server 3, and different services are provided for respective users, as shown in FIG. 22, as an example of a process for identifying a user who accesses the objective device 1, and executing a process for each user. The flow charts of the objective device 1 of this embodiment use FIGS. 19 and 24.

In the fourth embodiment, FIG. 21 is used as an example of the database in the authentication server 3, and when the user touches the sensor 107 of the digital camera (objective device 1), authentication and personal identification are done to make setups according to the user. This embodiment will explain services which can be provided when a database shown in FIG. 25 is prepared in the authentication server 3 in addition to that shown in FIG. 21.

More specifically, services provided when the user touches the sensor 107 to make the objective device 1 look up the database of the authentication server 3 that records user information, and execute different processes for respective users will be explained.

In the fourth embodiment, when authentication is made outside the objective device 1, authentication data shown in FIG. 10 is sent to the authentication server 3. Since the authentication data shown in FIG. 10 matches registered data of Taro Yamada in the database shown in FIG. 21, it is determined that the user is Taro Yamada, the user ID is 12345, the gender is male, charge data is 2000 yen, and so forth, and Taro Yamada is authenticated as the user who has the right of use of the objective device 1. In this embodiment, data to be sent from the objective device 1 to the authentication server 3 contains authentication data and device ID data. That is, the data shown in FIG. 10 is sent.

Assume that a database having data shown in FIG. 25 is present in the authentication server 3. The database need not always be present in the server as long as it can be accessed by the authentication server 3 on the network. FIG. 25 shows the user ID for only one user, but the authentication server 3 can store and manage a plurality of user IDs.

In this embodiment, the authentication server 3 authenticates by comparing authentication data sent from the objective device 1 with that which is held in advance in the server as in the fourth embodiment. The authentication process is to compare authentication data. In this embodiment, when the database shown in FIG. 21 is looked up using authentication data as a key, the user ID and the like can be revealed. When the database is searched using the user ID "12345" as a keyword, user data shown in FIG. 25 is found. At this time, management for each user is not limited to the user ID, but other keywords such as the user name and the like can be used as long as they can specify the user. Of course, authentication data can be used.

In the database shown in FIG. 25, the user ID "12345" has four sets of information such as use permission device ID data, service level, and use history. The user ID may have five or more sets of information. The use permission device ID data is ID data of the device the user is granted permission of use. The service level is the level of a service the user can receive when he or she uses the use permission device ID data; S is the highest service level and E is the lowest service level. The service level lowers in the order of S, A, B, C, D, and E. The use history indicates the number of times the user used the objective device 1 having the use permission ID data.

Hence, the user ID "12345" can use the use permission device ID data "ASC-0000001" at the service level "S", and the use history indicates "15" times.

The authentication server 3 searches for data corresponding to the level, as described above, and sends the service level to the objective device 1. The objective device 1 receives the service level, and temporarily saves it. After that, upon receiving user setup data via a communication with the user setup data recording device 2, the objective device 1 executes a process corresponding to the saved service level (step S2400 in FIG. 24).

The process corresponding to the service level includes a process for, e.g., limiting the use time of the digital camera (objective device 1) to one week for the service level S (highest) or to 30 min for the service level E (lowest). The objective device 1 executes such setup on the basis of the service level (step S2010).

Personal information such as use permission device ID data, use history, or the like is helpful data for product development and sales of the manufacturer, which can acquire such data without the knowledge of the user. The service level of the user changes depending on the use history and the like; when the user repetitively uses an identical product or manufacturer, the service level rises, and the user can receive better services.

For example, assume that the objective device 1 is a digital camera, and the objective device 1 managed by the authentication server 3 is a rental digital camera. The manufacturer lends the user the rental digital camera, and can collect a use fee. In this case, when the user makes registration in the authentication server 3 in advance, he or she need only touch the sensor of the digital camera to effect a hire process.

More specifically, when the user touches the sensor, authentication data is transferred to the authentication server 3 to execute an authentication process. At this time, rental data such as a rental time, model, and the like are saved in the authentication server, thus completing the rental process.

Also, the number of photos that can be taken by that digital camera is unlimited for the service level S, 40 for A, 20 for B, 10 for C, 5 for D, and 2 for E. In FIG. 25, the user with the user ID "12345" can unlimitedly take photos with a camera corresponding to use permission ID data "ASC-0000001", 40 photos with a camera "Auto Set", 20 photos with a camera "Digital Camera", and so forth. In this way, flexible service levels can be set based on use permission device ID data. The manufacturer can recognize the use histories of the respective users and can provide better services to a user who uses products of that manufacturer, and the user can enjoy such services.

The aforementioned mechanism can be variously applied. For example, a service type may be used in place of the service level, and a service that the user receives may be changed depending on that type. Alternatively, charge data may be multiplied by a given discount rate depending on the use history to provide a bargain service. Also, the database in FIG. 25 may be segmented to save user setup data of individual users, and statistical data indicating the ways the objective device 1 is used can be acquired.

Users may be categorized into groups laid down by a service provider, and services corresponding to groups may be provided. For example, different services may be provided depending on whether the user belongs to a male or female group, or whether the user belongs to a courtesy or regular member group. In this way, different services corresponding to different groups can be provided.

As described above, according to this embodiment, when the database shown in FIG. 25 is added to the authentication server 3, the manufacturer can provide various services, and the user can enjoy such services.

Seventh Embodiment

This embodiment will explain a case wherein different services are provided by storing data in the user setup data recording device 2, and changing the number of data acquired by the objective device 1 for each user, as shown in FIG. 22, as an example of a process for identifying a user who accesses the objective device 1, and executing a process for each user.

For example, assume that device setup data for a given objective device 1 contains 10 items (shutter speed, AF ON/OFF, ISO 100/400, and the like if the objective device 1 is, e.g., a digital camera). A method of providing a service that limits the number of items which can be used depending on users in such circumstance (for example, an objective device 1A allows user α to make setups using all 10 items of the objective device 1, but allows user β to make setups using only three items) will be explained.

The objective device 1 according to this embodiment changes items used in setups depending on users in step S2400 in FIG. 24. For this purpose, the objective device 1 or the authentication server 3 that can communicate with the objective device 1 saves data for ranking users, and processes executed in correspondence with the ranks of users.

For example, the user rank includes S (highest), A, B, C, and D (lowest). In the process corresponding to the user rank, if device setup data of a given objective device 1 has 10 items, the user of rank S can make setups of the objective device 1 using all the 10 items, the user of rank A can use 8 items, the user of rank B can use 6 items, the user of rank C can use 4 items, and the user of rank D can use only 2 items. Upon executing this process, the objective device 1 may receive and process user setup data of all the 10 items from the user setup data recording device 2, or may receive only items corresponding to the user-rank.

The user ranking method is not particularly limited. For example, a high rank may be given to a user who frequently uses products of the manufacturer of the objective device 1, or a user who has made user registration. Also, users may be ranked with reference to data such as a use history, and the like described in the above embodiment.

In this way, a service received at an identical objective device 1 can be changed depending on users. With this function, the manufacturer or dealer of the objective device 1 can provide value-added services.

Eighth Embodiment

Figure 26:
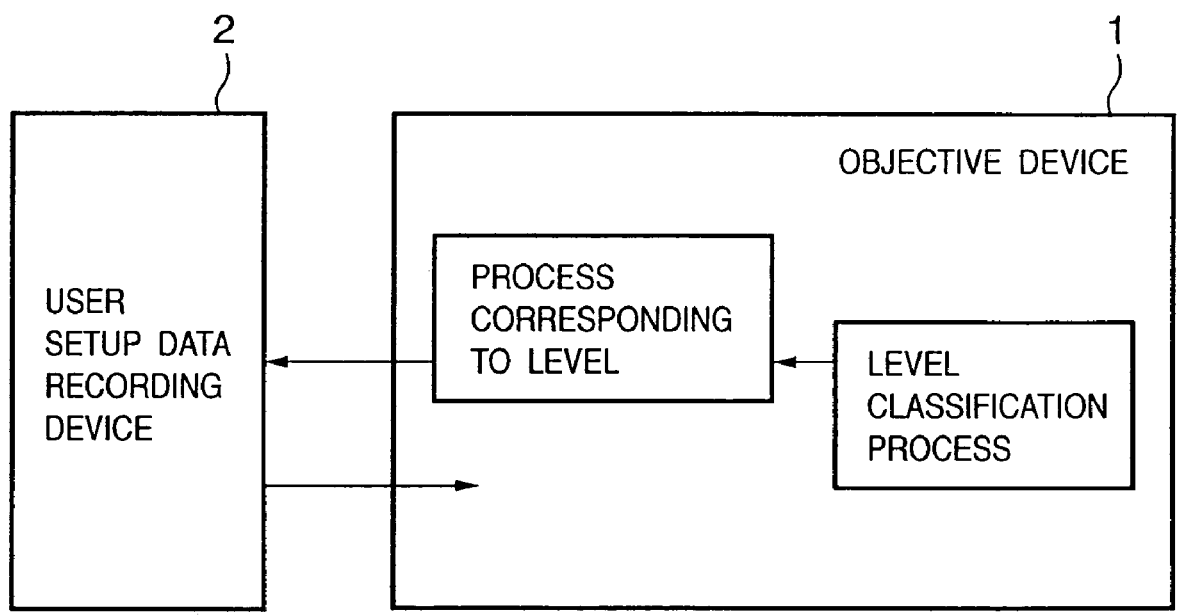
FIG. 26 is a block diagram showing characteristic functions of an information processing system according to the eighth embodiment of the present invention.

FIG. 26 is a block diagram showing characteristic functions of an information processing system according to the eighth embodiment of the present invention.

This embodiment will explain a case wherein a process corresponding to the level of data to be sent to a user setup data recording device 2 is executed, e.g., different services are provided by storing data in the user setup data recording device 2, and changing the number of data to be acquired by the objective device 1 for respective users, as shown in FIG. 26, as an example of a process for identifying a user who accesses the objective device 1, and executing a process for each user.

Figure 27:
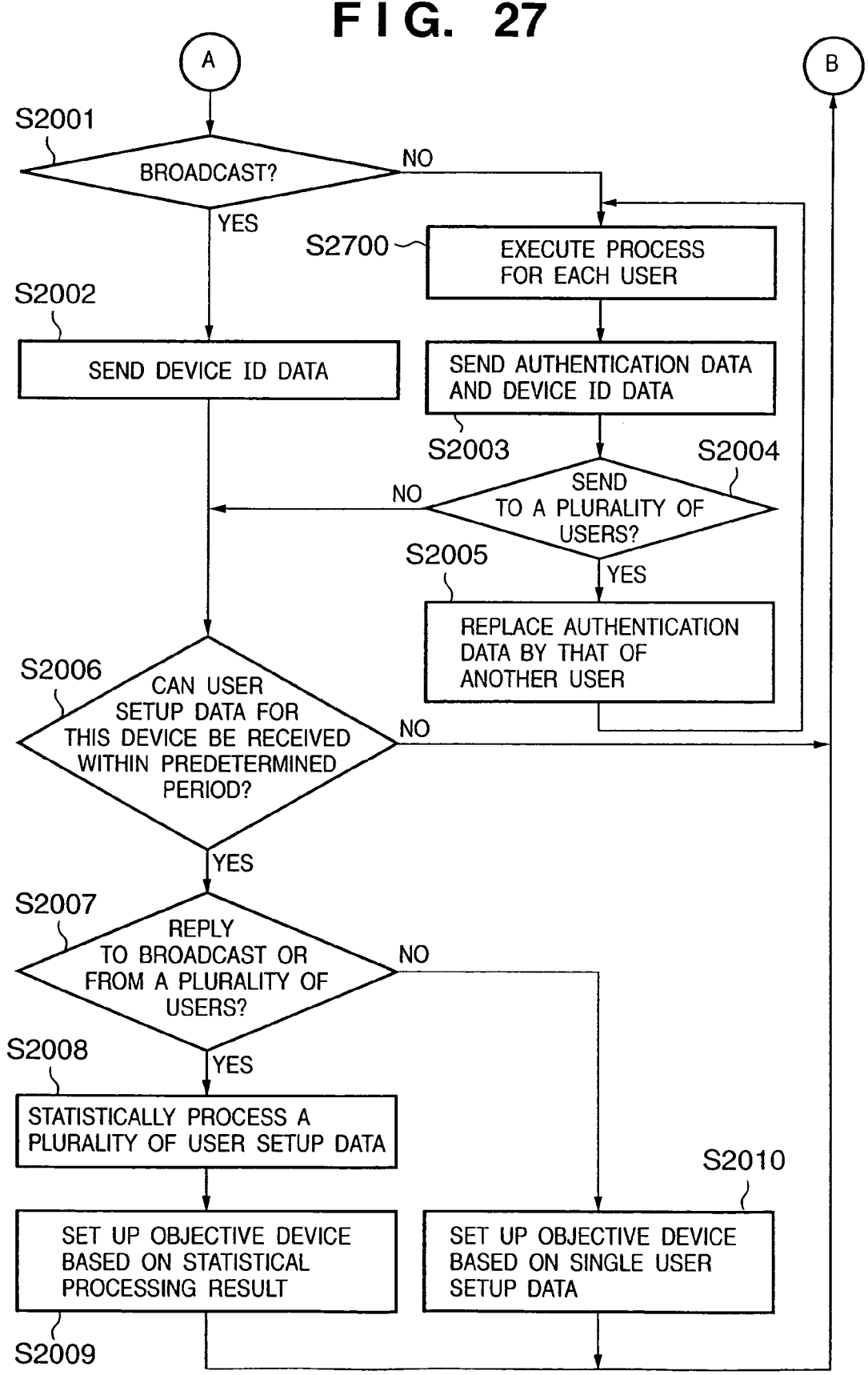
FIG. 27 is a flow chart showing the operation of an objective device 1 of the eighth embodiment.

The flow charts showing the operation of the objective device 1 according to this embodiment use FIGS. 19 and 27. The difference between FIGS. 20 and 27 is that a process in step S2700 is added. In this embodiment, the difference will be supplemented.

The seventh embodiment has explained the method of providing services that limit the number of items which can be used depending on users (for example, device setup data for a given objective device 1 includes 10 items, and the objective device 1 allows user α to make setups using all 10 items, but allows user β to make setups using only three items). However, this embodiment provides such services by another method.

In this embodiment, data to be sent from the objective device 1 to the user setup data recording device 2 undergoes a process corresponding to a pertinent level (step S2700 in FIG. 27), and is then sent (step S2003).

In the process in step S2700, items used in steps are changed. The objective device 1 or the authentication server 3 that can communicate with the objective device 1 saves data for ranking users, and processes executed in correspondence with the ranks of users. For example, the user rank includes S (highest), A, B, C, and D (lowest). In the process corresponding to the user rank, if device setup data of a given objective device 1 has 10 items, the user of rank S can make setups of the objective device 1 using all the 10 items, the user of rank A can use 8 items, the user of rank B can use 6 items, the user of rank C can use 4 items, and the user of rank D can use only 2 items.

Upon executing this process, the objective device 1 may receive and process user setup data of all the 10 items from the user setup data recording device 2, or may receive only items corresponding to the user rank. This depends on implementation contents of step S2700, i.e., processes to be done in correspondence with ranks.

The user ranking method is not particularly limited. For example, a high rank may be given to a user who frequently uses products of the manufacturer of the objective device 1, or a user who has made user registration.

The objective device 1 sends authentication data, device ID data, and data generated by the process in step S2700 to the user setup data recording device 2. In this embodiment, only items of device setup data corresponding to a pertinent rank are sent as data generated in the process in step S2700. Upon receiving blank device setup data, the user setup data recording device 2 returns items and values of user setup data corresponding to the items of the received device setup data.

The objective device 1 receives the user setup data. At this time, since the objective device 1 receives user setup data corresponding to the user rank, it executes a setup process based on the received items and values.

In this way, a service received at an identical objective device 1 can be changed depending on users. With this function, the manufacturer or dealer of the objective device 1 can provide value-added services.

Since the number of items of device ID data to be sent from the objective device 1 to the user setup data recording device 2 can be reduced, a high transmission rate and short data processing time can be achieved due to the reduced transmission data size.

Ninth Embodiment

Figure 28:
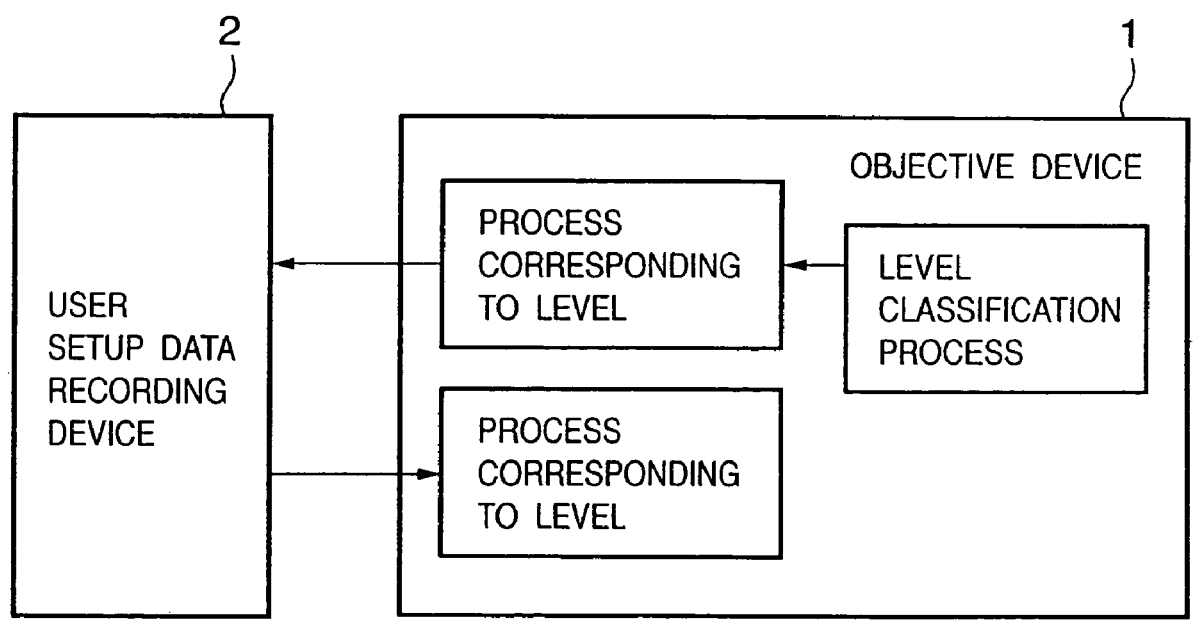
FIG. 28 is a block diagram showing characteristic functions of an information processing system according to the ninth embodiment of the present invention.

FIG. 28 is a block diagram showing characteristic functions of an information processing system according to this embodiment.

This embodiment will explain a case wherein data to be sent from an objective device 1 to a user setup data recording device, and data received from the user setup data recording device respectively undergo processes corresponding to their respective levels, as shown in FIG. 28, as an example of a process for identifying a user who accesses the objective device 1, and executing a process for each user. More specifically, a service provided when the objective device 1 changes a process according to data obtained by searching databases shown in FIGS. 29A and 29B which are prepared in the user setup data recording device 2 will be explained below.

As shown in the image in FIG. 30, assume that the objective device 1 is an air conditioner, and is set up on the basis of the setups of users who belong to a given group. These users are ranked. In this embodiment, the group that uses the objective device 1 includes two users, i.e., user A with authentication data "OijdiOI" and user B with authentication data "AoijOJ". In the objective device 1, authentication data of these users are registered as a group.

Figure 20:
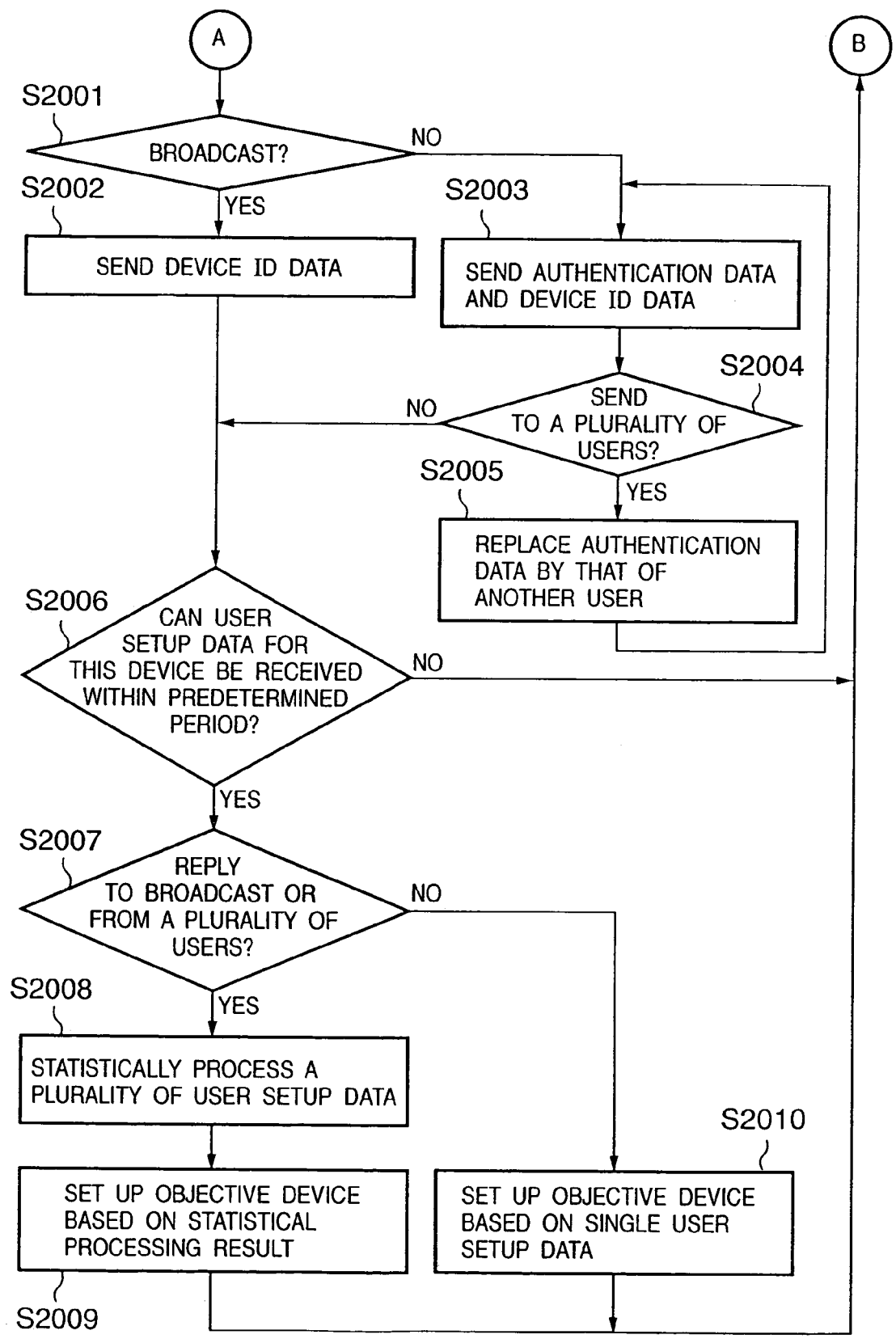
FIG. 20 is a flow chart showing the operation of the objective device 1 of the fourth embodiment.
Figure 31:
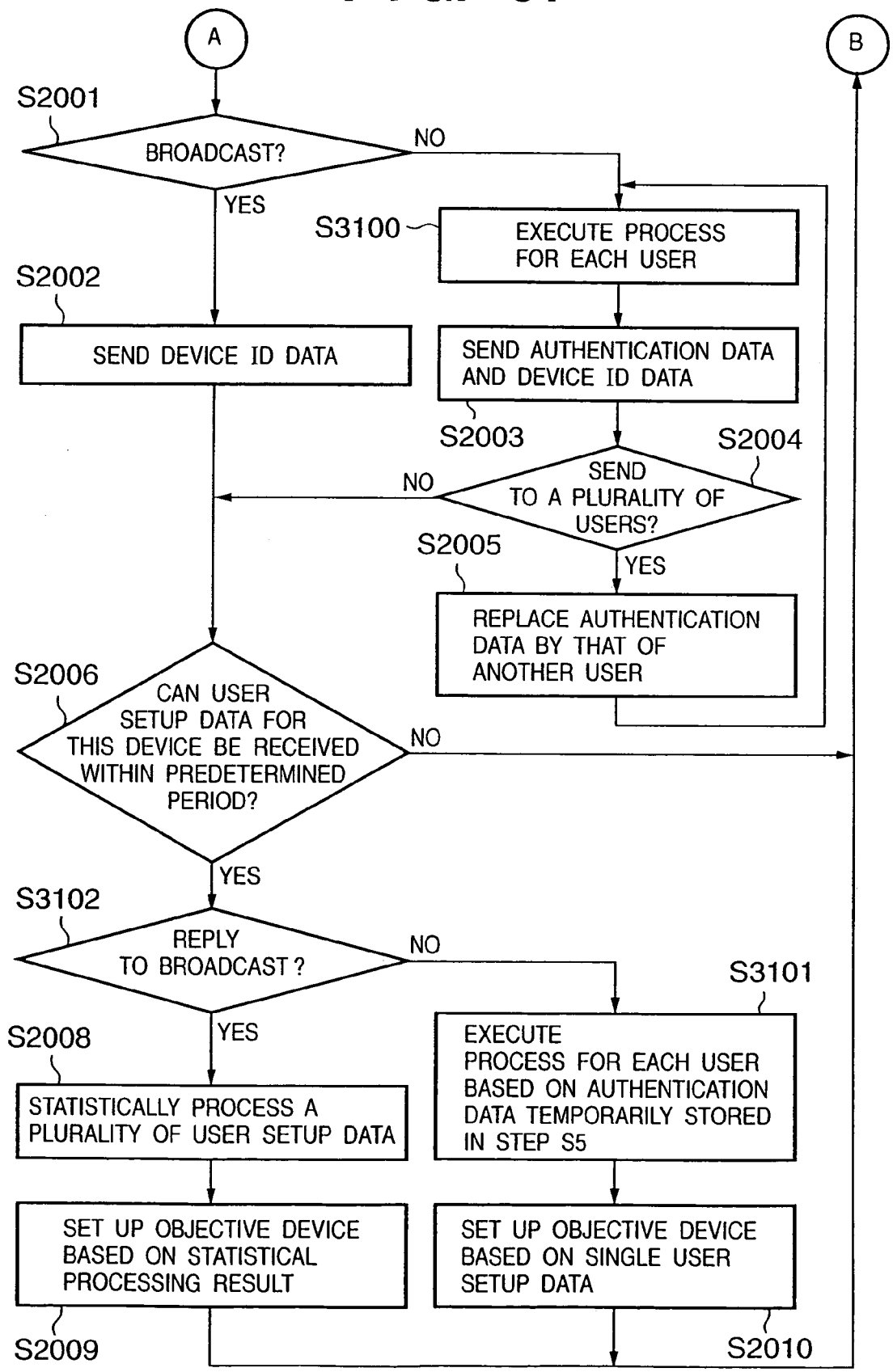
FIG. 31 is a flow chart showing the operation of an objective device 1 of the ninth embodiment.

The flow charts of the objective device 1 according to this embodiment use FIGS. 20 and 31. The difference between FIGS. 20 and 31 is that processes of steps S3110, S3101, and S3102 are added. In this embodiment, transmission to a plurality of users is used.

The flow of the processes of this embodiment from a re-setup situation will be explained in detail below.

The user sets the objective device 1 in an initial state by turning on its power supply 192. User A presses the finger 4 against the fingerprint sensor 107 of the objective device 1. The fingerprint sensor 107 is activated upon detecting touch with the finger 4 (step S1). If the sensor is activated, it checks if a registration start action has been done (step S2). In this case, assume that the registration start action has not been done.

Since the registration start action has not been done, physical information can be read (step S4). If read has failed, the control returns to the initial state. The read data is temporarily saved in the RAM 102, and is converted into the authentication data "OijdiOI" by the data converter 104 (step S5). If fingerprint information is directly used in personal identification without being converted into authentication data, this data conversion process may be skipped. When the CPU 101 can perform data conversion, the data converter 104 may be omitted. Furthermore, the data conversion process may include a security process such as encryption. The converted authentication data is stored in the RAM 102.

Since the registration start action has not been done, no data which can be registered is sent (step S6).

An authentication process is done inside or outside the objective device 1. A supervisor of the objective device 1 must set in the objective device 1 information indicating whether fingerprint authentication is done inside or outside the objective device 1, in correspondence with the structure and operating environment of the objective device 1 (step S1901). In this embodiment, the authentication process is executed inside the objective device 1.

When fingerprint authentication is executed inside the objective device 1, the pattern matching unit 103 compares authentication data, which is generated by acquiring fingerprint information by the sensor and is stored in the RAM 102 and the registered authentication data stored in the flash ROM 106 (step S1904). If the flash ROM 106 stores authentication data which matches that in the RAM 102, the user has the right of use of the objective device 1; otherwise, the user does not have such right. If the user has the right of use, the flow advances to step S2001 in FIG. 31; otherwise, the control returns to the initial state. In this embodiment, user level classification is also done in step S1904. Assume that user A is registered in the objective device 1 as level B, and user B who appears later as level S. Therefore, if the authenticated user is user A, his or her level is classified to level B.

The objective device 1 then checks if it broadcasts device setup data (step S2001).

The objective device 1 records in the RAM 102 information indicating if broadcast was made. Whether or not broadcast is made is expressed by whether authentication data is appended or not to data to be transmitted. Since this embodiment uses a wireless communication means, if data is merely sent using an identical frequency, data is distributed to all objective devices 1 and user setup data recording devices 2 which are present around the source objective device 1. In this embodiment, assume that broadcast is not to be made.

Then, a process for each user is executed (step S3100). In this embodiment, since the user who touched the sensor of the objective device 1 is user A, whose rank is B, only an item "temperature" of device setup data of the objective device 1 is reflected in actual setups.

In this embodiment, since broadcast is not made, the objective device 1 sends the authentication data in the RAM 102, device ID data in the startup ROM 105 or flash ROM 106, and device setup data of only the item "temperature" determined by level B of user A to the user setup data recording device 2 (step S2003). Data to be sent is as shown in FIG. 32. Upon sending data, the authentication data stored in the RAM 102 is converted into an appropriate communication protocol in the CPU 101, and is sent via the data transmitter 113 and wireless I/F 111 using the wireless channel 5.

After the data is sent (step S2003), it is checked if identical device ID data is to be sent to a plurality of users (step S2004). The checking process in step S2004 is effective when the setups of only given group members are to be reflected in a given objective device 1 in place of unspecified setups within the communication range of the objective device 1.

If it is determined in step S2004 that the data is to be sent to a plurality of users, the authentication data is replaced by that for the group members (step S2005), and the replaced data is sent (step S2003). The group members are set in advance in the objective device 1.

In this embodiment, the group that uses the objective device 1 includes two users, i.e., user A with authentication data "OijdiOI" and user B with authentication data "AoijOJ". In the objective device 1, authentication data of these users are registered as a group. Since user A has operated the sensor of the objective device 1, the objective device 1 sends the data also to user B as a member of the group.

The objective device 1 replaces the authentication data by that for user B (step S2005). The level of user B is registered as S in the objective device 1. The objective device 1 searches for the level of user B using the authentication data. The level S of user B is read, and as a process corresponding to the level S, items "temperature" and "humidity" of device setup data are reflected in actual setups (step S3100). The objective device 1 sends data shown in FIG. 33 for user B (step S2003). Since no more group members are registered, NO is determined in the process in step S2004, and the control of the objective device 1 advances to step S2006 as a reply standby state from the user setup data recording device 2.

The processes in the user setup data recording device 2 have been explained previously with reference to the flow chart in FIG. 8.

In this embodiment, the user setup data recording device 2 possessed by user A has the database shown in FIG. 29A, and that possessed by user B has the database shown in FIG. 29B.

The user setup data recording device 2 possessed by user A receives data shown in FIG. 32, and that possessed by user B receives data shown in FIG. 33. As for user A, since the device setup data includes only the item "temperature", the user setup data recording device 2 possessed by user A sends device ID data, corresponding use history values, and a value "26" of the item "temperature" of user setup data in FIG. 29A to the objective device 1. The user setup data recording device 2 possessed by user B sends device ID data, corresponding use history values, and a value "22" of the item "temperature" and a value "10" of the item "humidity" of user setup data in FIG. 29B to the objective device 1.

The respective user setup data recording device 2 updates use history values corresponding to the device ID data received from the objective device 1. For example, the items of the received device ID data are compared with those of device ID data already held by the user setup data recording device 2, and if they match, the corresponding use history value is incremented by 1.

The objective device 1 checks if it can receive data sent within a predetermined period (step S2006). If the objective device 1 cannot receive any data within the predetermined period, the control returns to the initial state without any process.

Since the objective device 1 recorded in the RAM 102 in step S2001 information indicating that it broadcasted data or sent data to a plurality of users, if it broadcasted data or sent data to a plurality of users, the received data is processed as a reply thereto; otherwise, the received data is processed as a reply from a single user (step S3102). In this embodiment, the objective device 1 waits for and receives replies from the user setup data recording devices 2 of users A and B.

The objective device 1 compares if the device ID data contained in the received data matches its own device ID data. If the two data match, since the received data is a reply to the data sent by the objective device 1 itself, and a process is executed; otherwise, the received data is discarded. Note that items of the device ID data to be actually compared in a search are not specified in the above description, but they may be determined by the manufacturer of the user setup data recording device 2 or may be of user's choice.

If broadcast was not made (step S3102), the objective device 1 is set up again on the basis of the received user setup data, and the control returns to the initial state.

If broadcast was made (step S3102), a plurality of received user setup data are statistically processed (step S2008), and the objective device 1 is set up again on the basis of the statistical processing result (step S2009). The control then returns to the initial state.

In this embodiment, data was not broadcasted but was sent to a plurality of users. Hence, NO is determined in step S2007, and a process for each user is executed in step S3101. The objective device 1 receives only the value "26" of the item "temperature" for user A, and the value "22" of the item "temperature" and the value "10" of the item "humidity" for user B in addition to the device ID data and use history values corresponding to the items of the device ID data. The level of user A is B, and that of user B is S.

The objective device 1 executes a process corresponding to the user level (step S3101). As for humidity, since the objective device 1 receives "10" alone as the user setup data of user B, it is set to have "humidity" of "10"%. Then, temperature is set. The setup values of temperature are received from both users A and B. The levels of users A and B are compared. If the users have identical level, the sum total of the values is simply divided by the number of users. For example, if users A and B have identical level, since the received values are "26" and "22", the objective device 1 is set to attain "24" degrees.

However, user A has rank B, and user B has rank S. Hence, a process that preferentially uses the user setup data of rank S is executed. For example, "23" degrees may be set to be closer to the user setup data of user B with higher rank than "24" degrees as the average of the two users, or the user setup data of user A is ignored, and "22" degrees may be set. Although not exemplified, the objective device 1 receives use histories of the respective users with respect to the objective device 1. Hence, the process according to the level may be executed in step S3101 in consideration of the use histories of the users. For example, user setup data of a user with larger use history values may be reflected in the objective device 1 more easily.

The process executed in step S3101 depends on implementation contents of the manufacturer of the objective device 1. This embodiment is one example. In the above example, data to be updated by device ID data is the use history. Of course, other items may be updated. For example, the number of times of charge, date, and the like may be updated.

When programs according to the flow charts of the respective embodiments are stored in, e.g., the flash ROM 106 in the objective device 1 to operate the objective device 1, the control methods of the above embodiments can be implemented.

The objective device 1 and user setup data recording device 2 can be added with a function of encrypting data to be sent. In this case, a data encryption function is required. Encryption may be done by the CPU 101, or a dedicated chip for encryption may be prepared. At the same time, if data is encrypted, the objective device 1 and user setup data recording device 2 must have a function of receiving encrypted data, and decrypting that data. Data decryption may be done by the CPU 101 or a dedicated chip for decryption may be prepared. In the present invention, such schemes are not particularly limited.

When data is encrypted, the security of communication data can be improved compared to a case wherein data is exchanged without being encrypted. If public key cipher is adopted as an encryption scheme, and the objective device 1 generates a secret key based on sensor information, the data can be used not only in encryption but also in user authentication and specification of the user setup data recording device 2.

In the above embodiments, the objective device 1 has the sensor 107. This is to assure data security and to use the device as a user interface. That is, since the objective device 1 comprises the sensor, personal identification and authentication can be made, and the user setup data recording device 2 cannot be used if it is acquired by a third party, thus protecting setup data which reflects user's favor.

Furthermore, the sensor 107 and level classification means can execute authentication to identify a user who accesses the objective device 1, and different processes for respective users can be executed. Moreover, a user interface which can set up the objective device 1 in response to only user's action upon reading the physical information using the sensor can be provided.

When the sensor 107 detects the user, it reads the physical information of that user to generate authentication data. The objective device 1 itself or the authentication server compares the already registered authentication data with the generated authentication data to make authentication. As a result of authentication, if the user has the right of use, the objective device 1 executes a process corresponding to the level as needed, and sends authentication data, device ID data, and the like to the user setup data recording device 2. If the user has no such right, no data is sent.

The user setup data recording device 2 makes personal identification, i.e., checks using the authentication data if the user setup data recording device 2 is that of the current user. If no problem is found as a result of personal identification, the user setup data recording device 2 searches for user setup data corresponding to the objective device 1 using the previously received device ID data as a key. If the corresponding user setup data is found, the user setup data recording device 2 sends the user setup data and device ID data. The objective device 1 receives the user setup data, executes a process corresponding to a level as needed, and executes a setup process on the basis of the received user setup data.

Therefore, the user can undergo personal identification and authentication by reading physical information using the sensor. That is, the user can send setups of the objective device 1, which have been registered in the user setup data recording device 2 once to the objective device 1 to set it up, when the sensor detects the user.

In the above embodiments, the digital camera and air conditioner are set up. Electronic devices that can undergo the above setup process are not particularly limited. For example, the present invention can be applied to various use objects and use situations such as ① the angle and position of a vehicle seat, ② the angle of the seatback, and the method, strength, and position of massage of a massage chair, ③ setups of the tone volume, surround type, and loudspeaker direction of a sound device, ④ video recording setups of types of programs that are frequently recorded by a video recorder, ⑤ the degree and direction of illumination of an illumination appliance, ⑥ the level and temperature of a bath, ⑦ the temperature, wind speed adjustment, and the like of an air conditioner, ⑧ a copying machine and printer, and the like.

For example, when the objective device is a device which is connected to a network to upload data (e.g., a digital camera, digital video camera, or portable telephone), the user setup data recording device sends an upload destination URL (FIG. 34) as user setup data to the objective device, thus uploading data in the objective device to the upload destination URL.

For example, if the objective device is a digital camera, when the user touches the shutter of the digital camera (objective device) with a finger, data shown in FIG. 34 is sent form the user setup data recording device to the digital camera. When the user takes a photo, the digital camera looks up an image saving destination URL designated by the user setup data, and transfers the taken image file. The image file is sent, and is automatically saved.

As a result, the upload destination URL corresponding to the device is correctly set, and the user can save a taken image at the designated URL irrespective of a digital camera he or she used to take a photo.

When the objective device is a printer at user's destination (e.g., on a street corner), and when the user touches an auto print button, the user setup data recording device sends a URL registered therein by the user to the objective device as user setup data (FIG. 35).

The printer as the objective device downloads and prints data from a server at the designated URL. With this arrangement, a specific newspaper or the like can be printed by a nearby printer when the user touches it.

Hence, the user need only touch the printer to easily print data he or she ordinarily looks up without any data transfer operation.

When the objective device is a network-connected device notebook PC, portable telephone, PDA, PC, or the like, and when the user touches a network connection button, the user setup data recording device sends a telephone number of a dial-up destination, which is registered therein by the user, to the objective device as user setup data. The objective device can install the dial-up destination designated as the user setup data as a telephone number of an access point for network connection.

Consequently, the user need only touch the notebook PC at his or her destination to connect the access point or service provider he or she ordinarily uses.

When the objective device is a driver's seat of a vehicle, and when the user touches an authentication section of that seat with a finger, the user setup data recording device sends seat adjustment information, which is registered therein by the user, to the objective device as user setup data (FIG. 37).

The seat adjusts the angle of a seatback, the up-and-down and back-and-forth positions of the seat, and the angle of a headrest on the basis of the received data.

As a result, the user need only touch the seat to set the seat according to his or her favor.

When the objective device is a massage chair, and when the user touches an authentication section of that massage chair, the user setup data recording device sends massage chair adjustment information, which is registered therein by the user, to the objective device as user setup data (FIG. 38). The massage chair adjusts the angle of a seatback, the angle of a footrest, the strength of foot vibration, the operation time, massage type, strength, and schedule on the basis of the received data.

As a result, the user can undergo massage with his or her favorite massage method and schedule.

In the above embodiments, the fingerprint sensor for measuring a feature of a body is used as the sensor. Of course, various other sensors may be used. For example, since the iris pattern of a human eye has a personal difference as in fingerprints, an iris sensor may be attached to a viewfinder of a digital camera, and when the user looks into the viewfinder, the iris sensor may be activated to generate image information data of the iris pattern or authentication data as converted data.

Furthermore, as still another embodiment, DNA information contained in human hair, sputum, sweat, or the like may be used. Since DNA information has a personal difference, a hair, sputum, or sweat sensor may be arranged to read DNA information and to generate authentication data. Moreover, since voiceprints also have a personal difference, a microphone (sensor) may be provided to the objective device to sample voiceprints from a user's voice and to generate authentication data based on the sampled voiceprint information.

In this embodiment, the digital camera and wristwatch are assumed as forms of the objective device and user setup data recording device. However, the present invention can be applied even when they have other forms. For example, examples of the objective device include an illumination appliance, sound system, seat, and the like in addition to the digital camera. Examples of the user setup data recording device include a portable telephone, PDA, portable music player, and the like. Note that items of device setup data exchanged between the objective device and user setup data recording device differ depending on the types of objective devices 1. For example, when the objective device 1 is a sound device, items "tone volume", "surround mode type (Movie, Hall, and the like)", "loudspeaker direction", and the like are used in place of items "shutter speed", "AF ON/OFF", and the like.

In FIGS. 1, 2, 15, and 16, the flash ROMs 106 and 203 are used to save data, but other recording media such as a hard disk drive (HDD) and the like may be used. Likewise, the data receivers 112 and 212 and data transmitters 113 and 213 may be replaced by data transceivers which integrate them.

Also, the wireless transmission scheme, frequency, type, and the like are not particularly limited. Furthermore, infrared rays, a wireless LAN, ultrasonic waves, light, and the like may be used. In this embodiment, a wireless communication is used as a communication medium, but a wired communication may be used instead. Furthermore, a communication method using a human body is known, and such method may be used.

Note that the present invention is not limited to the apparatus of the above embodiments, and may be applied to either a system constituted by a plurality of devices, or an apparatus consisting of a single equipment. The present invention is also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention. As the recording medium for supplying the program code, for example, a floppy disk, hard disk, optical disk, magneto-optical disk, CD-ROM, CD-R, magnetic tape, nonvolatile memory card, ROM, and the like may be used. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

As a case (prior art) combined with fingerprints described in the above embodiments, a technical article "user interface based on fingerprint recognition" ("Interaction '99", pp. 169-176, March, 1999) is known. In this article, a technique "Finger Storage (Finger Memo)" has been proposed. As a feature of "Finger Storage", "data can be copied between different terminals via a finger".

However, as a practical implementation method of "Finger Storage", "when a finger touches another terminal, matching is made with a fingerprint pattern in a Finger ID Table, and a data object corresponding to that finger is acquired via a network". "Finger Storage" holds pairs of fingerprint patterns and data as the Finger ID Table, and a fingerprint pattern is used to search for data. In other words, when only fingerprints of hands are used, a maximum of 10 pairs can only be held.

By contrast, the present invention is not limited to 10 pairs unlike "Finger Storage" since the fingerprint and data are not paired. The present invention uses device ID data (e.g., a serial number, product name, and the like) as a search key upon searching for data saved in the user setup data recording device, while "Finger Storage" searches for data using a fingerprint pattern as a key.

As described above, according to the present invention, the need for user's manual re-setup operations every time the user uses a device he or she set it once can be obviated. Also, the user is free from any action for selecting data from several patterns of setup data.

The supervisor or the like of the objective device (electronic device) can limit user's access to the objective device without impairing user's operability. With this access limitation, different services can be provided for respective users.

As many apparently widely different embodiments of the present invention can be made without departing from the spirit and scope thereof, it is to be understood that the invention is not limited to the specific embodiments thereof except as defined in the appended claims.

What is claimed is:

1. A system comprising a first apparatus and a second apparatus,
said first apparatus being an image pickup apparatus and comprising:
an acquisition unit configured to acquire identification information of a user, who operates said first apparatus, from the user;
a first transmission unit configured to transmit the identification information acquired by said acquisition unit and specific information of said first apparatus to said second apparatus;
a first reception unit configured to receive, from said second apparatus, image pickup apparatus setup data indicating the user's preference regarding the setup of said first apparatus; and
a setup unit configured to set up said first apparatus upon executing a predetermined function on the basis of the setup data received by said first reception unit; and
said second apparatus comprising:
a storing unit configured to store the identification information of the user, the specific information of said first apparatus, and image pickup apparatus setup data corresponding to the identification information and the specific information;
a second reception unit configured to receive the identification information and the specific information transmitted from said first apparatus; and
a second transmission unit configured to transmit the image pickup apparatus setup data corresponding to the identification information and the specific information received by said second reception unit to said first apparatus,
wherein a plurality of users operate said first apparatus, and image pickup apparatus setup data for the plurality of users is stored only on said second apparatus.

2. The system according to claim 1, wherein the image pickup apparatus setup data transmitted by said second transmission unit can be registered from said first apparatus in said second apparatus.

3. A first apparatus which can execute a predetermined function, comprising:
an image pickup unit configured to acquire an image;
an acquisition unit configured to acquire identification information of a user, who operates said first apparatus, from the user;
a transmission unit configured to transmit the identification information acquired by said acquisition unit and specific information of said first apparatus to a second apparatus;
a reception unit configured to receive, from the second apparatus, image pickup unit setup data indicating the user's preference regarding the setup of said first apparatus; and
a setup unit configured to set up said first apparatus upon executing the predetermined function on the basis of the image pickup unit setup data received by said reception unit.

4. The first apparatus according to claim 3, further comprising:
a registration unit configured to register the image pickup unit setup data in the second apparatus.

5. A second apparatus which can set up a first apparatus, comprising:
a storing unit configured to store identification information of a user who operates the first apparatus, specific information of the first apparatus, and image pickup apparatus setup data corresponding to the identification information and the specific information, the first apparatus being an image pickup apparatus;
a reception unit configured to receive the identification information of the user and specific information of the first apparatus transmitted from the first apparatus; and
a transmission unit configured to transmit, to the first apparatus, image pickup apparatus setup data corresponding to the identification information and the specific information received by said reception unit,
wherein
a plurality of users operate the first apparatus,
the image pickup apparatus setup data to be transmitted by said transmission unit is data used to set up the first apparatus upon executing a predetermined function, and
the image pickup apparatus setup data for the plurality of users is stored only on said second apparatus.

6. The device according to claim 5, wherein the image pickup apparatus setup data is data registered by the first apparatus.

7. A method of controlling a first apparatus which can execute a predetermined function, comprising:
the acquisition step of acquiring identification information of a user, who operates the first apparatus, from the user;
the transmission step of transmitting the identification information acquired in said acquisition step and specific information of the first apparatus to a second apparatus;
the reception step of receiving, from the second apparatus, image pickup apparatus setup data indicating the user's preference regarding the setup of the first apparatus, the first apparatus being an image pickup apparatus; and
the set-up step of setting up the first apparatus upon executing the predetermined function on the basis of the image pickup apparatus setup data received in said reception step.

8. A method of controlling a second apparatus which can set up a first apparatus, comprising:
the storing step of storing identification information of a user who operates the first apparatus, specific information of the first apparatus, and image pickup apparatus setup data corresponding to the identification information and the specific information, the first apparatus being an image pickup apparatus;
the reception step of receiving the identification information of the user and specific information of the first apparatus transmitted by the first apparatus; and
the transmission step of transmitting, to the first apparatus, image pickup apparatus setup data corresponding to the identification information and the specific information received in said reception step,
wherein
a plurality of users operate the first apparatus,
the image pickup apparatus setup data to be transmitted in said transmission step is data used to set up the first apparatus upon executing a predetermined function,
and the image pickup apparatus setup data for the plurality of users is stored only on the second apparatus.

* * * * *